United States Patent
Conway et al.

(10) Patent No.: US 7,438,204 B2
(45) Date of Patent: Oct. 21, 2008

(54) APPARATUS FOR DISPENSING A GRANULAR PRODUCT FROM A CONTAINER

(75) Inventors: Simon M. Conway, Burlington, WI (US); Kristopher W. Gerulski, Racine, WI (US); Kenneth V. Bakken, Shafer, MN (US); Joseph Paul Kirchberg, Pine City, MN (US); David Wayne Lease, Lindstrom, MN (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 11/249,843

(22) Filed: Oct. 13, 2005

(65) Prior Publication Data

US 2007/0084885 A1    Apr. 19, 2007

(51) Int. Cl.
B67D 3/00 (2006.01)
(52) U.S. Cl. ............... 222/486; 222/142.7; 220/253
(58) Field of Classification Search ......... 222/480–482, 222/548, 486–489, 503, 506, 142.6, 142.7; 220/253, 255, 254.7, 254.8, 254.9; 215/263, 215/265, 256
See application file for complete search history.

(56) References Cited

U.S. PATENT DOCUMENTS

| | | |
|---|---|---|
| 47,909 A | 5/1865 | Hulot |
| 426,342 A | 4/1890 | Wallace, Jr. |
| 496,554 A | 5/1893 | Duesbury |
| 873,497 A | 12/1907 | Buell |
| 942,562 A | 12/1909 | Hyde |
| 975,451 A | 11/1910 | Pane |
| 988,804 A | 4/1911 | Moore |
| 1,032,610 A | 7/1912 | Kern |
| 1,077,459 A | 11/1913 | Driscoll |
| 1,208,189 A | 12/1916 | Miller |
| 1,464,347 A | 8/1923 | Avenson et al. |
| 1,522,796 A | 1/1925 | Bartlomie |
| 1,596,996 A | 8/1926 | Rasmussen |
| 1,802,199 A | 4/1931 | Costello |
| 1,870,390 A | 8/1932 | Sprigings |
| 1,997,492 A | 4/1935 | Lirio |
| 2,036,739 A | 4/1936 | Arnold |
| 2,051,665 A | 8/1936 | West |
| 2,064,189 A | 12/1936 | Bodor |

(Continued)

FOREIGN PATENT DOCUMENTS

CH    251848 A    11/1947

(Continued)

OTHER PUBLICATIONS

International Search Report & Written Opinion for PCT/US2006/040186 dated May 7, 2007.

*Primary Examiner*—Lien T Ngo

(57) ABSTRACT

A dispensing cap for a container includes a first lid having a dispensing surface and a skirt depending from a periphery thereof. The dispensing surface is formed from at least one of a substantially transparent and translucent material and includes several apertures. A second lid has a second dispensing surface and a second skirt depending from a periphery thereof that is adapted to be inserted into and releasably held within the first lid. The second dispensing surface includes several orifices. The first and second lids are rotatable a full 360° relative to one another.

12 Claims, 28 Drawing Sheets

U.S. PATENT DOCUMENTS

| | | |
|---|---|---|
| 2,095,879 A | 10/1937 | Kittredge et al. |
| 2,185,284 A | 1/1940 | Wilson |
| 2,209,050 A | 7/1940 | Church |
| 2,294,303 A | 8/1942 | Jagon |
| 2,294,393 A | 9/1942 | Erne |
| 2,327,391 A | 8/1943 | Baker |
| 2,349,724 A | 5/1944 | Henderson |
| 2,480,606 A | 8/1949 | Rabbitt |
| 2,526,397 A | 10/1950 | Nyden et al. |
| 2,562,647 A * | 7/1951 | Shaver ........................ 222/480 |
| 2,605,028 A | 7/1952 | Nyder et al. |
| 2,619,266 A | 11/1952 | McDonald |
| 2,635,791 A | 4/1953 | Nyder et al. |
| 2,645,382 A | 7/1953 | Plough |
| 2,679,331 A | 5/1954 | Stoneman et al. |
| 2,704,623 A | 3/1955 | Yasso |
| 2,815,154 A | 12/1957 | Smith |
| 2,817,451 A | 12/1957 | Giles et al. |
| 2,826,345 A | 3/1958 | Thomsen |
| 2,832,514 A | 4/1958 | O'Connor |
| 3,045,871 A | 7/1962 | Henrickson |
| 3,063,602 A | 11/1962 | Anderson |
| 3,071,276 A | 1/1963 | Pellett et al. |
| 3,126,125 A * | 3/1964 | Eggers ........................ 221/96 |
| 3,131,833 A * | 5/1964 | Campbell, Jr. et al. ...... 222/183 |
| 3,140,019 A | 7/1964 | Barr |
| 3,145,880 A | 8/1964 | Whatley |
| 3,157,315 A | 11/1964 | Bianco |
| D200,019 S | 1/1965 | Gould |
| 3,194,455 A * | 7/1965 | Castelli ........................ 222/548 |
| D202,003 S | 8/1965 | Douglas |
| 3,214,068 A | 10/1965 | Armour |
| 3,217,949 A | 11/1965 | Dabis |
| 3,235,130 A | 2/1966 | Walther et al. |
| 3,260,423 A * | 7/1966 | Fillmore et al. ............. 222/548 |
| 3,260,426 A * | 7/1966 | Ayotte ........................ 222/548 |
| 3,317,087 A | 5/1967 | Landis |
| 3,365,106 A | 1/1968 | Lodding et al. |
| D212,589 S | 11/1968 | Roberts |
| 3,446,403 A | 5/1969 | Serio |
| D214,425 S | 6/1969 | Vanderhyde |
| 3,448,882 A | 6/1969 | Roy |
| D214,554 S | 7/1969 | Oltman et al. |
| 3,467,287 A | 9/1969 | Marchant et al. |
| 3,467,288 A | 9/1969 | Croyle |
| 3,478,439 A | 11/1969 | Hyldon |
| D217,807 S | 6/1970 | Douglas |
| 3,521,784 A | 7/1970 | Gaines et al. |
| 3,526,343 A | 9/1970 | O'Donnell |
| 3,542,258 A | 11/1970 | Marchant |
| 3,549,053 A | 12/1970 | Anderson |
| 3,643,838 A | 2/1972 | Allen |
| 3,658,217 A | 4/1972 | Collie et al. |
| D224,640 S | 8/1972 | Mascia et al. |
| D224,642 S | 8/1972 | Mascia et al. |
| D224,644 S | 8/1972 | Mascia et al. |
| 3,768,688 A | 10/1973 | Linke |
| D231,087 S | 4/1974 | Edwards |
| D237,684 S | 11/1975 | Koprowski et al. |
| 3,917,100 A | 11/1975 | Dukess |
| 4,120,432 A * | 10/1978 | Fuchs ........................ 222/565 |
| 4,209,101 A | 6/1980 | Brown |
| D256,674 S | 9/1980 | Hoyt |
| 4,301,949 A | 11/1981 | Palson et al. |
| D262,906 S | 2/1982 | Palson et al. |
| D263,120 S | 2/1982 | Fossella et al. |
| D265,974 S | 8/1982 | Gombert |
| D267,781 S | 2/1983 | Thompson |
| D267,782 S | 2/1983 | Thompson |
| 4,380,307 A | 4/1983 | Stillinger |
| 4,386,712 A | 6/1983 | DeWallace |
| 4,402,433 A | 9/1983 | Webinger |
| D273,093 S | 3/1984 | Lunden et al. |
| 4,488,667 A | 12/1984 | Swett et al. |
| D278,602 S | 4/1985 | Rosenstein |
| 4,531,649 A | 7/1985 | Shull |
| 4,548,331 A | 10/1985 | Montgomery |
| D283,479 S | 4/1986 | Swett et al. |
| 4,607,768 A | 8/1986 | Taber et al. |
| 4,653,672 A | 3/1987 | Tuerk et al. |
| 4,684,554 A | 8/1987 | Ou-Yang |
| 4,693,399 A | 9/1987 | Hickman et al. |
| 4,703,872 A | 11/1987 | Cornette et al. |
| 4,723,693 A | 2/1988 | DeCoster |
| 4,776,489 A | 10/1988 | Tarlow et al. |
| D303,100 S | 8/1989 | Segati |
| 4,883,203 A | 11/1989 | Kittscher |
| 4,898,292 A | 2/1990 | VerWeyst et al. |
| 4,925,067 A | 5/1990 | Zemlo et al. |
| 4,936,494 A | 6/1990 | Weidman |
| 4,955,513 A | 9/1990 | Bennett |
| 4,986,866 A | 1/1991 | Ohba et al. |
| D317,121 S | 5/1991 | Crawford et al. |
| D318,613 S | 7/1991 | Halm et al. |
| D318,777 S | 8/1991 | Freese |
| D319,389 S | 8/1991 | Halm |
| 5,086,952 A | 2/1992 | Kryk |
| D328,710 S | 8/1992 | Deflander |
| 5,176,271 A | 1/1993 | Painchaud et al. |
| 5,183,171 A | 2/1993 | Pherigo |
| D340,187 S | 10/1993 | Forsyth |
| D340,188 S | 10/1993 | Forsyth |
| 5,330,082 A | 7/1994 | Forsyth |
| 5,332,014 A | 7/1994 | Feig |
| D351,348 S | 10/1994 | Marriage |
| D352,458 S | 11/1994 | Gray |
| D352,899 S | 11/1994 | Molo |
| 5,383,582 A | 1/1995 | Baxter et al. |
| 5,407,107 A | 4/1995 | Smith |
| D357,870 S | 5/1995 | O'Neill et al. |
| 5,487,494 A | 1/1996 | Robbins, III |
| 5,509,582 A | 4/1996 | Robbins, III |
| D370,127 S | 5/1996 | Bonaddio et al. |
| 5,542,579 A | 8/1996 | Robbins, III |
| 5,601,213 A | 2/1997 | Daniello |
| D379,152 S | 5/1997 | Richardson |
| D381,867 S | 8/1997 | Jeppesen et al. |
| D398,534 S | 9/1998 | Verdura, Jr. et al. |
| D399,050 S | 10/1998 | Evans |
| D399,425 S | 10/1998 | Ramsey |
| D399,654 S | 10/1998 | Mandell |
| D403,963 S | 1/1999 | Ramsey |
| 5,857,275 A | 1/1999 | Deal |
| D410,388 S | 6/1999 | Fisher et al. |
| 5,922,422 A | 7/1999 | Otruba |
| 5,971,231 A | 10/1999 | Samz et al. |
| D423,362 S | 4/2000 | Di Bartolo et al. |
| D424,944 S | 5/2000 | Mohary et al. |
| D426,464 S | 6/2000 | Mohary et al. |
| 6,116,469 A | 9/2000 | Wallays et al. |
| 6,129,802 A | 10/2000 | Key |
| D433,337 S | 11/2000 | Cautereels |
| 6,202,902 B1 | 3/2001 | Starr |
| D439,843 S | 4/2001 | Dalmau |
| D440,156 S | 4/2001 | Lonczak et al. |
| 6,209,921 B1 | 4/2001 | Hogan et al. |
| 6,212,803 B1 | 4/2001 | Key |
| D443,825 S | 6/2001 | Goettner |
| 6,250,517 B1 | 6/2001 | Samz et al. |
| D444,390 S | 7/2001 | Kokenge et al. |
| D445,692 S | 7/2001 | Meeker et al. |
| D449,229 S | 10/2001 | Mohary et al. |
| 6,299,033 B1 | 10/2001 | VerWeyst et al. |
| 6,308,870 B2 | 10/2001 | Samz et al. |

| | | |
|---|---|---|
| D451,402 S | 12/2001 | Kokenge et al. |
| D452,156 S | 12/2001 | Kokenge et al. |
| D455,655 S | 4/2002 | Bunce |
| D457,439 S | 5/2002 | Meeker et al. |
| D460,694 S | 7/2002 | Llusca |
| D460,696 S | 7/2002 | Goettner |
| D462,618 S | 9/2002 | Meeker et al. |
| 6,460,718 B1 | 10/2002 | Vogel |
| 6,464,113 B1 | 10/2002 | Vogel |
| 6,468,646 B2 | 10/2002 | Carson et al. |
| D465,150 S | 11/2002 | Crawford et al. |
| 6,488,187 B2 | 12/2002 | Sheffler et al. |
| D469,698 S | 2/2003 | Zaksenberg et al. |
| D471,240 S | 3/2003 | Hanson et al. |
| D471,460 S | 3/2003 | Paul et al. |
| D471,592 S | 3/2003 | Hanson et al. |
| 6,543,496 B2 | 4/2003 | Woodruff |
| D476,372 S | 6/2003 | Hanson et al. |
| D476,560 S | 7/2003 | Hanson et al. |
| 6,594,928 B1 | 7/2003 | Clawson et al. |
| D479,470 S | 9/2003 | Braaten et al. |
| D479,801 S | 9/2003 | Carmichael et al. |
| D480,113 S | 9/2003 | Hanson et al. |
| 6,617,004 B2 | 9/2003 | Lake et al. |
| D482,624 S | 11/2003 | Hadkte et al. |
| 6,691,901 B2 | 2/2004 | Parve |
| 6,732,772 B2 | 5/2004 | Woodruff |
| D491,067 S | 6/2004 | Crawford |
| D491,815 S | 6/2004 | Crawford |
| D492,202 S | 6/2004 | Crawford |
| D493,369 S | 7/2004 | Murphy |
| 6,758,358 B1 | 7/2004 | Bloom |
| 6,783,014 B2 | 8/2004 | Luker |
| D495,605 S | 9/2004 | Crawford |
| D495,607 S | 9/2004 | Bezek |
| 6,857,211 B2 | 2/2005 | Grasso |

FOREIGN PATENT DOCUMENTS

DE      29502980 U1      4/1995

* cited by examiner

APPARATUS FOR DISPENSING A GRANULAR PRODUCT FROM A CONTAINER

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present disclosure relates to an apparatus that facilitates dispensing of a granular product from a hand-held container.

2. Description of the Background of the Invention

Hand-held containers for granular products have been used to dispense powders, pellets, seeds, and other flowable solid particles. These products may be found in common consumer goods such as carpet powders, fertilizers, grass seeds, and cleansers, to name a few. Generally, containers for dispensing solid products are fashioned without regard to the ease with which a user may utilize the container. For example, some product containers comprise square or rectangular boxes with single or multiple orifices disposed on top ends thereof. Such containers are difficult to grasp, require too much frictional force to be exerted by a user's hand, and/or have poor dispensing characteristics. Other containers have cylindrical sidewalls or substantially cylindrical surfaces with varying types of hand grips disposed therein to assist in grasping the container. However, these containers still do not obviate the need for a user to exert an excessive amount of force by the user's fingers and do not provide enhanced dispensing characteristics.

SUMMARY OF THE INVENTION

According to one embodiment of the present invention, a dispensing cap for a container comprises a first lid having a dispensing surface and a skirt depending from a periphery thereof. The dispensing surface is formed from at least one of a substantially transparent and translucent material and includes several apertures. A second lid has a second dispensing surface and a second skirt depending from a periphery thereof that is adapted to be inserted into and releasably held within the first lid. The second dispensing surface includes several orifices. The first and second lids are rotatable a full 360° relative to one another.

According to another embodiment of the present invention, an omnidirectional dispensing mechanism comprises an annular outer portion and a first surface spanning the annular outer portion. The first surface includes a plurality of equidistantly spaced rows of orifices. An annular inner portion is provided with a second surface spanning the annular inner portion. An exterior of the second surface and the annular inner portion is adjacent an interior of the first surface and the annular outer portion, respectively. The second surface includes a plurality of equidistantly spaced openings. Each row of orifices includes a proximal orifice that is closer to a center of the first surface and has a smaller cross-sectional area than a distal orifice. The annular inner portion is releasably retained within the annular outer portion. Further, the annular outer portion and the first surface are rotatable relative to the annular inner portion and the second surface.

According to yet another embodiment of the present invention, a lid for a receptacle comprises an outer lid having a circular first surface and an outer skirt depending from a periphery thereof. A retaining bead extends circumferentially around an inside wall of the outer skirt below the first surface. The retaining bead includes spaced interruptions therein. An inner lid is provided having a circular second surface and an inner skirt depending from a periphery thereof. The inner lid is sized to fit within the outer lid so that the inside wall of the outer skirt is adjacent an exterior wall of the inner skirt and a bottom lip of the inner skirt is in an interfering relationship with the retaining bead. The outer and inner lids are rotatable with respect to each other when engaged with one another. Further, the interruptions of the retaining bead are adapted to provide flexure to the outer lid for removal of same from the inner lid.

Other aspects and advantages of the present invention will become apparent upon consideration of the following detailed description and the attached drawings, in which like elements are assigned like reference numerals.

DETAILED DESCRIPTION OF THE DRAWINGS

Figure 1:
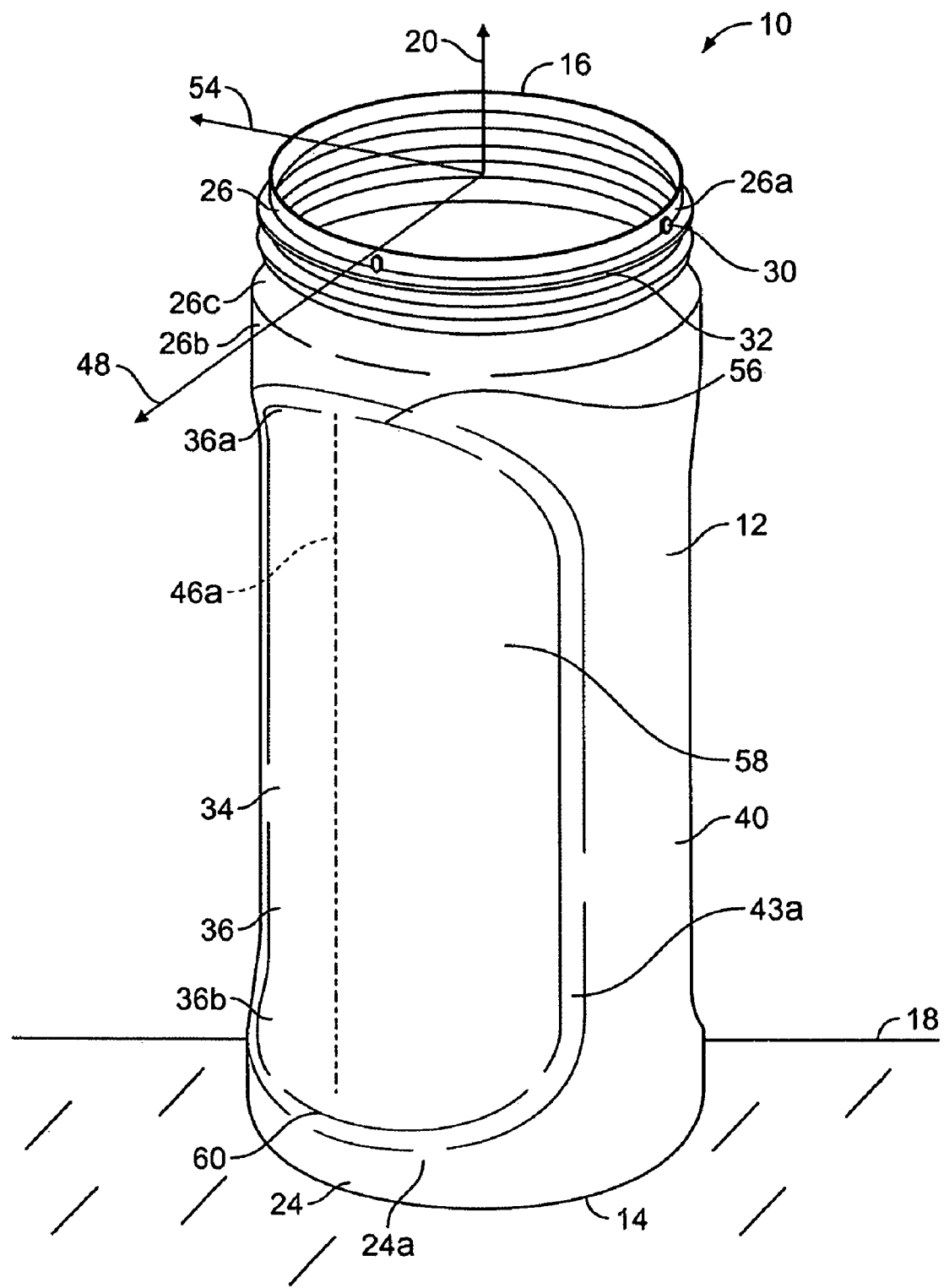
FIG. 1 is an isometric view of a top, front, and side of a container according to the present invention disposed on a support surface.
Figure 2:
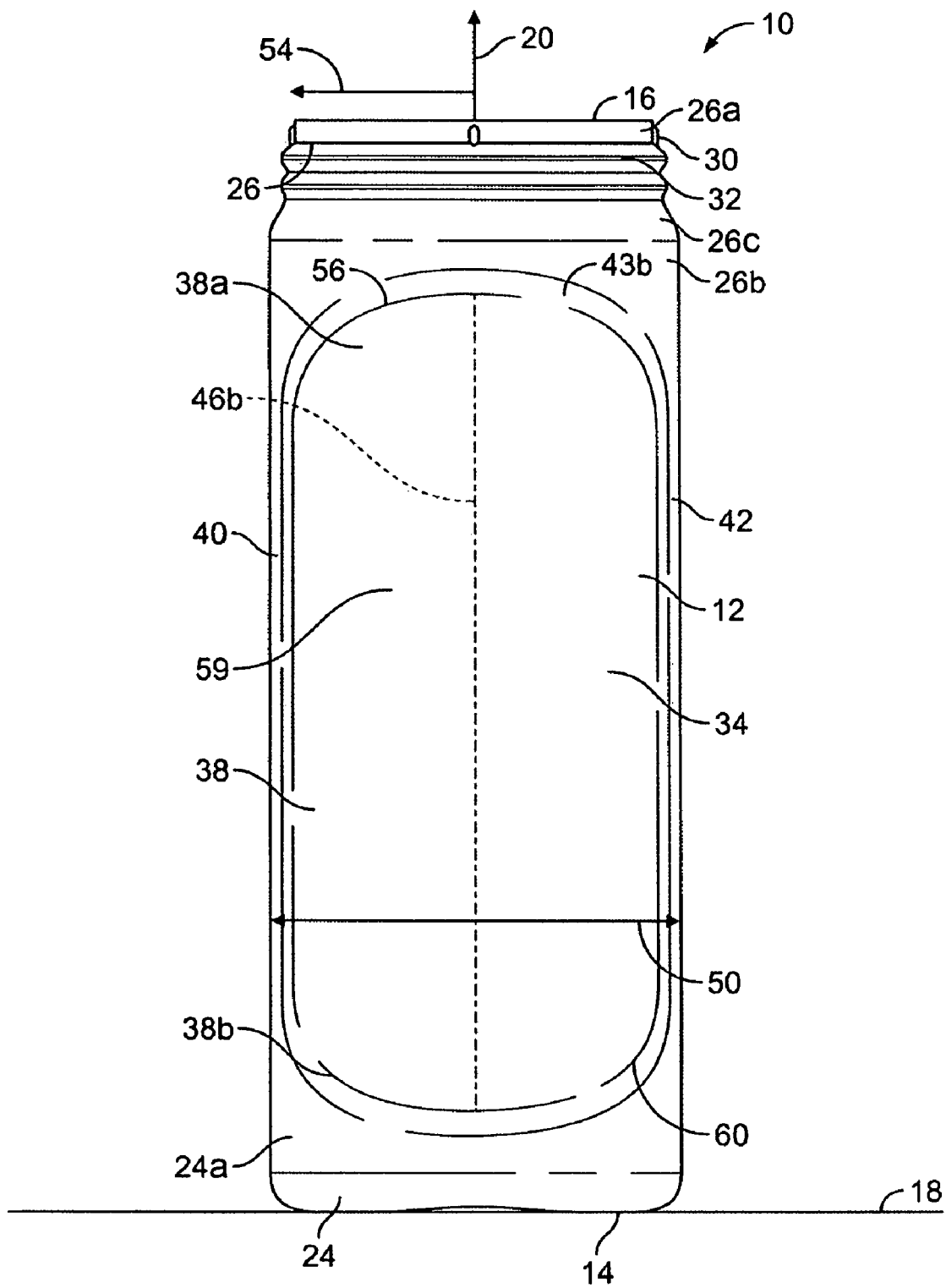
FIG. 2 is a rear elevational view of the container of FIG. 1.
Figure 3:
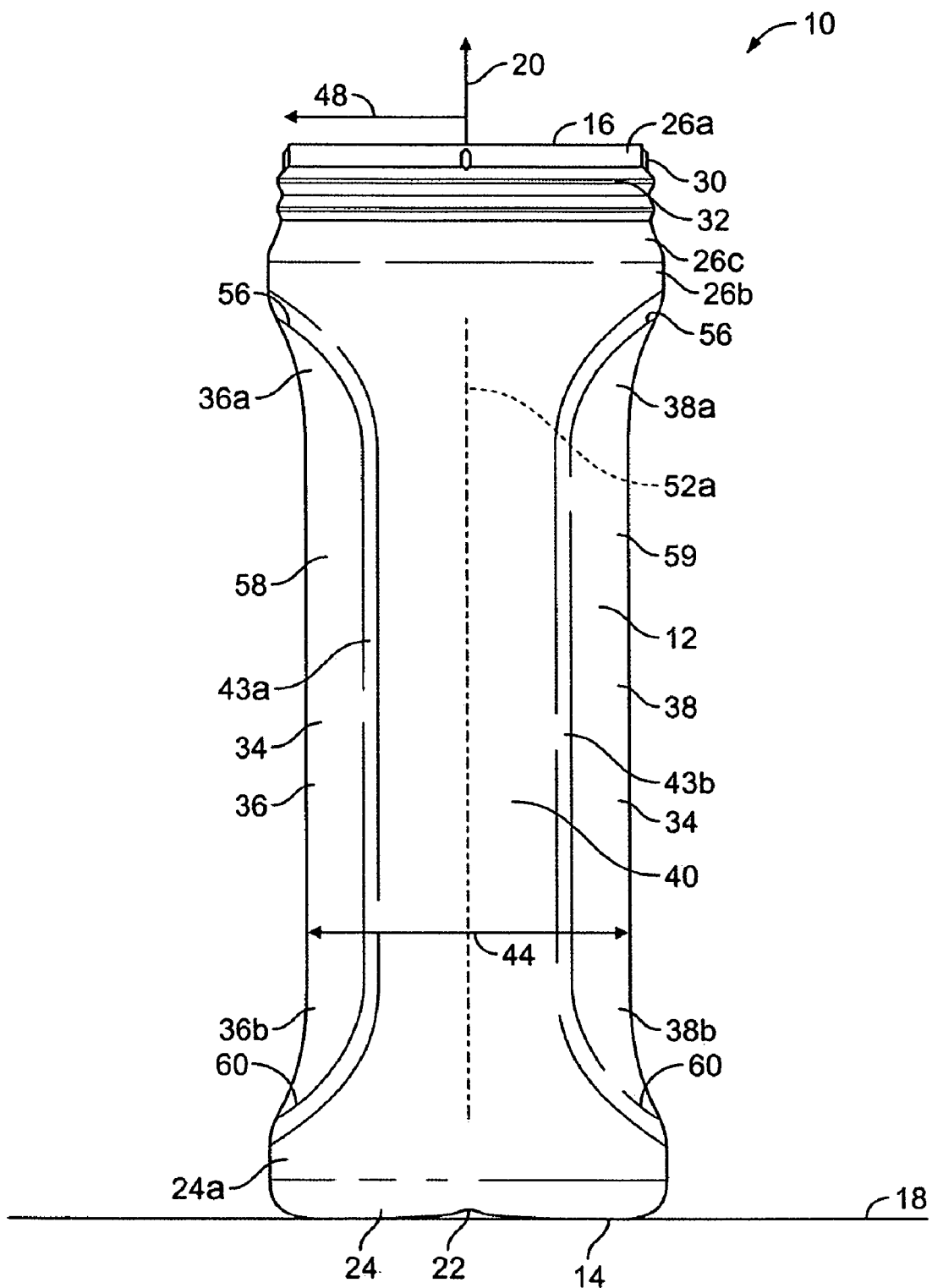
FIG. 3 is a side elevational view of the container of FIG. 1.
Figure 4:
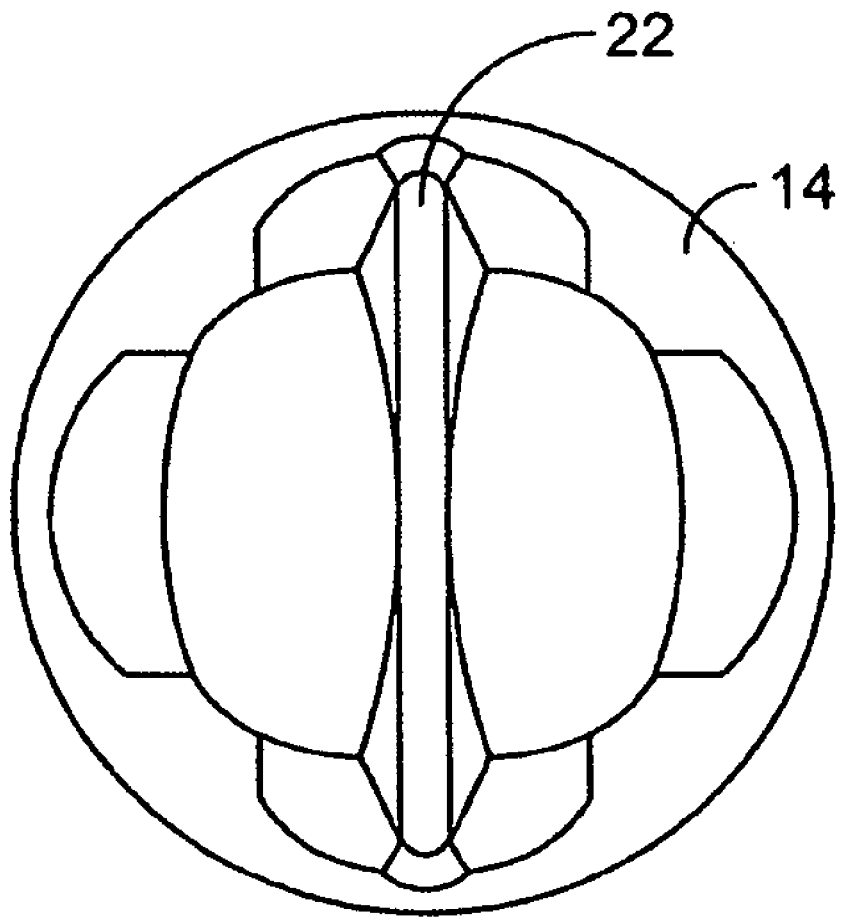
FIG. 4 is a bottom elevational view of the container of FIG. 1.

FIGS. 1-4 depict one type of container 10 comprising a body 12 with a bottom end 14 and a top end 16. The bottom end 14 of the container 10 may be disposed on an exemplary planar support surface 18 when the container 10 is not in use, thereby orienting a central or longitudinal axis 20 of the container 10 in a perpendicular relationship with respect to the support surface 18. The bottom end 14 is circular and includes a central depression 22 extending partially across a diameter thereof. Several oppositely disposed grooves and curved and/or planar surfaces are provided on either side of the depression 22.

The body 12 of the container 10 has a height preferably within a range of about 8.30 in. (21.1 cm) to about 8.50 in. (21.6 cm). In a particular embodiment, the distance is about 8.44 in. (21.4 cm). A first portion 24 generally tapers outwardly from the bottom end 14 to a circular cylindrical portion 24a. A second portion 26 of the body 12 adjacent the top end 14 is also circular cylindrical in shape. The second portion 26 includes various grooves and protuberances to provide a snap-fit connection with a dispensing mechanism 28, such as the one depicted in FIG. 5 described in greater detail below. Specifically, the second portion 26 has a circular cylindrical portion 26a adjacent the top end 16 and four spaced projections 30 that extend vertically and radially therefrom. The circular cylindrical portion 26a preferably has a diameter within a range of about 2.6 in. (6.60 cm) to about 2.8 in. (7.11 cm), and more preferably has a diameter of 2.68 (6.81 cm). An opening in the top end 16 preferably has a diameter within a range of about 2.40 in. (6.10 cm) to about 2.60 in. (6.60 cm), and more preferably has a diameter of 2.50 in. (6.35 cm). Two annular ridges 32 extend circumferentially around the second portion 26 below the spaced projections 30. The annular ridges preferably have a diameter adjacent an outermost portion of thereof within a range of about 2.8 in. (7.11 cm) to about 3.0 in. (7.62 cm), and more preferably have a diameter of about 2.88 in. (7.32 cm). The second portion 26 includes a further circular cylindrical portion 26b that is joined to the cylindrical portion 26a by a tapered portion 26c. The cylindrical portion 26b preferably has a diameter within a range of about 2.9 (7.37 cm) to 3.2 in. (8.13 cm), and more preferably has a diameter of about 3.08 in. (7.82 cm).

The body 12 further includes a gripping portion 34 that is disposed between the bottom and top ends 14, 16. More particularly, in the present embodiment the gripping portion 34 extends between the first and second portions 24, 26. The gripping portion 34 comprises oppositely disposed front and rear surfaces 36, 38, respectively, located between oppositely disposed first and second side surfaces 40, 42, respectively. The front and rear surfaces 36, 38 intersect other portions of the container 10 at curved transition portions 43a, 43b that preferably have a radius of curvature within a range of about 0.300 in. (0.762 cm) to about 0.450 in. (1.143 cm), and more preferably of about 0.375 in. (0.953 cm). In the present embodiment the gripping portion 34 overall has a curvilinear shape. More particularly, the front surface 36 includes upper and lower inwardly curved portions 36a, 36b, respectively. Similarly, the rear surface 38 of the present embodiment preferably includes upper and lower inwardly curved portions 38a, 38b, respectively, that are oppositely disposed with respect to the upper and lower portions 36a, 36b. Still further in the preferred embodiment the upper curved portions 36a, 38a are of the same shape and size, as are the lower curved portions 36b, 38b, and the upper curved portions 36a, 38a are mirror images of the lower curved portions 36b, 38b.

In addition, the first and second side surfaces 40, 42 are convex, and more particularly, preferably comprise oppositely disposed portions each having a partial cylindrical shape. Specifically, the circular cylindrical portions 24a, 26b and the first and second side surfaces 40, 42 together define an overall cylindrical shape that is interrupted by the gripping portion 34.

A distance between outermost surfaces of the two oppositely disposed front and rear surfaces 36, 38 defines a minor width dimension 44 that preferably varies over at least a portion of the length of the gripping portion 34 as noted in greater detail hereinafter. The minor width dimension 44 extends between longitudinally extending center lines 46a and 46b of the two oppositely disposed front and rear surfaces 36, 38, respectively. A line extending between the center lines 46a, 46b normal thereto defines an X axis 48 of the container 10 perpendicular to the longitudinal axis 20. Additionally, a distance between outermost surfaces of the two oppositely disposed first and second side surfaces 40, 42 defines a major width dimension 50 that preferably does not vary over the lengths of the surfaces 40, 42. The major width dimension 50 extends between longitudinally extending center lines 52a and 52b of the two oppositely disposed side surfaces 40, 42, respectively. A line extending between the center lines 52a, 52b normal thereto defines a Y axis 54 of the container 10 perpendicular to the longitudinal axis 20 and the X axis 48.

Each curved portion 36a, 38a slopes inwardly and downwardly from a top end 56 of the gripping portion 34 toward central portions 58, 59 of the front and rear surfaces 36, 38. The curved portions 36b, 38b further slope inwardly and upwardly from a bottom end 60 of the gripping portion 34 toward the central portions 58, 59. Preferably, the lengths of the central portions 58, 59 are equal and both are within a range of about 4.10 in. (10.40 cm) to about 4.50 in. (11.40 cm). More preferably, each central portion 58, 59 is about 4.27 in. (10.85 cm) in length. Also preferably, the front and rear surfaces 36, 38 have a constant minor width dimension 44 throughout the central portions 58, 59. Preferably, the constant minor width dimension 44 is in a range of about 2.300 in. (5.842 cm) to about 2.500 in. (6.350 cm). More preferably, the constant minor width dimension 44 is about 2.393 in. (6.078 cm). The radius of curvature of each central portion 58, 59 normal to the longitudinal axis 20 is preferably within a range of about 1.00 in. (2.54 cm) to about 3.00 in. (7.62 cm), and more preferably is about 2 in. (5.08 cm).

Further, the oppositely disposed cylindrical portions of the first and second side surfaces 40, 42 preferably establish a constant major width dimension 50 throughout a length of the gripping portion 34. Preferably, the constant major width dimension 50 is within a range of about 2.90 in. (7.37 cm) to 3.20 in. (8.13 cm). More preferably, the constant major width dimension 50 is about 3.08 in. (7.82 cm).

Figure 5:
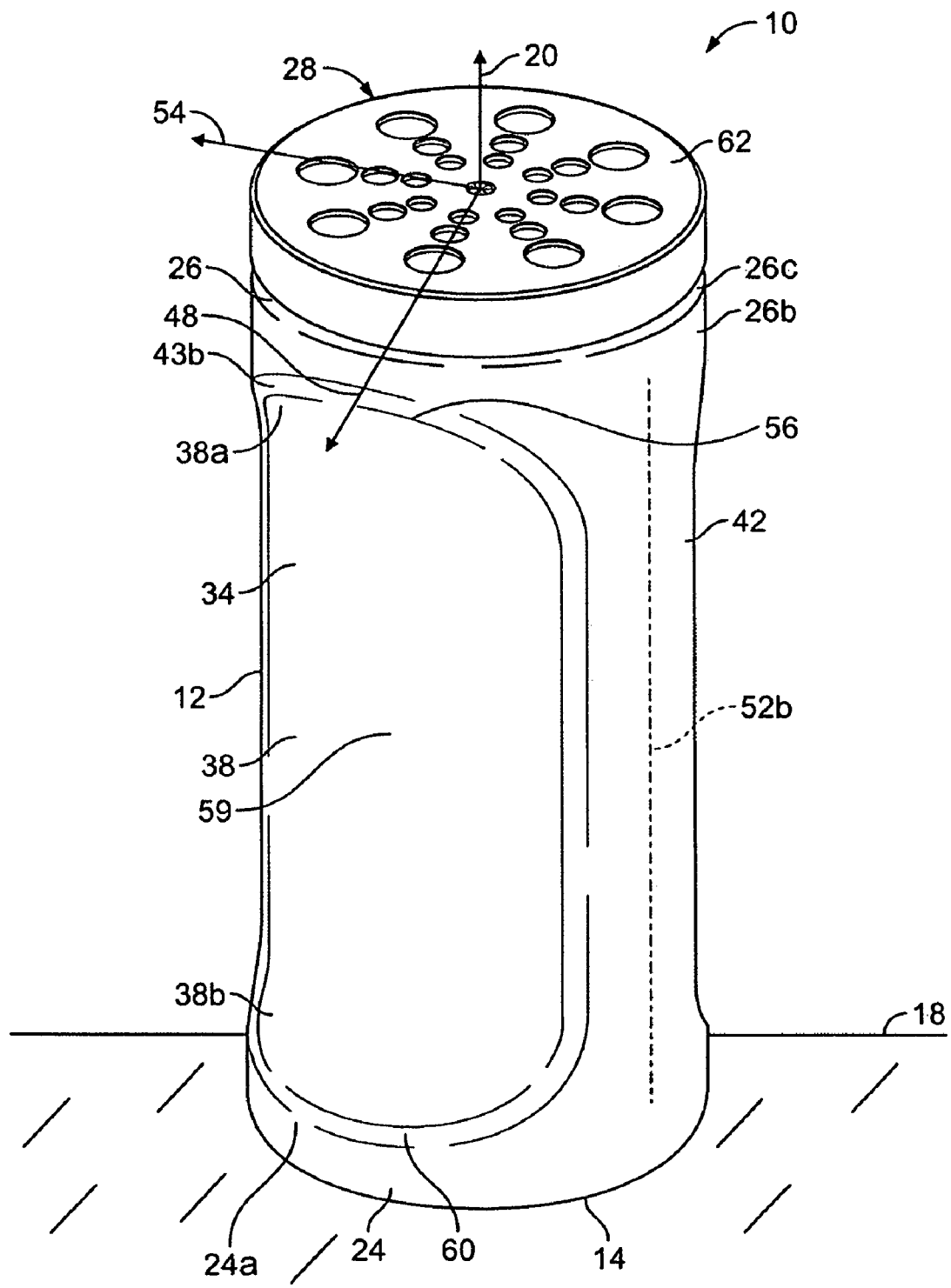
FIG. 5 is an isometric view of the container of FIG. 1 in a non-dispensing position and further including a dispensing mechanism disposed on a top end of the container.
Figure 6:
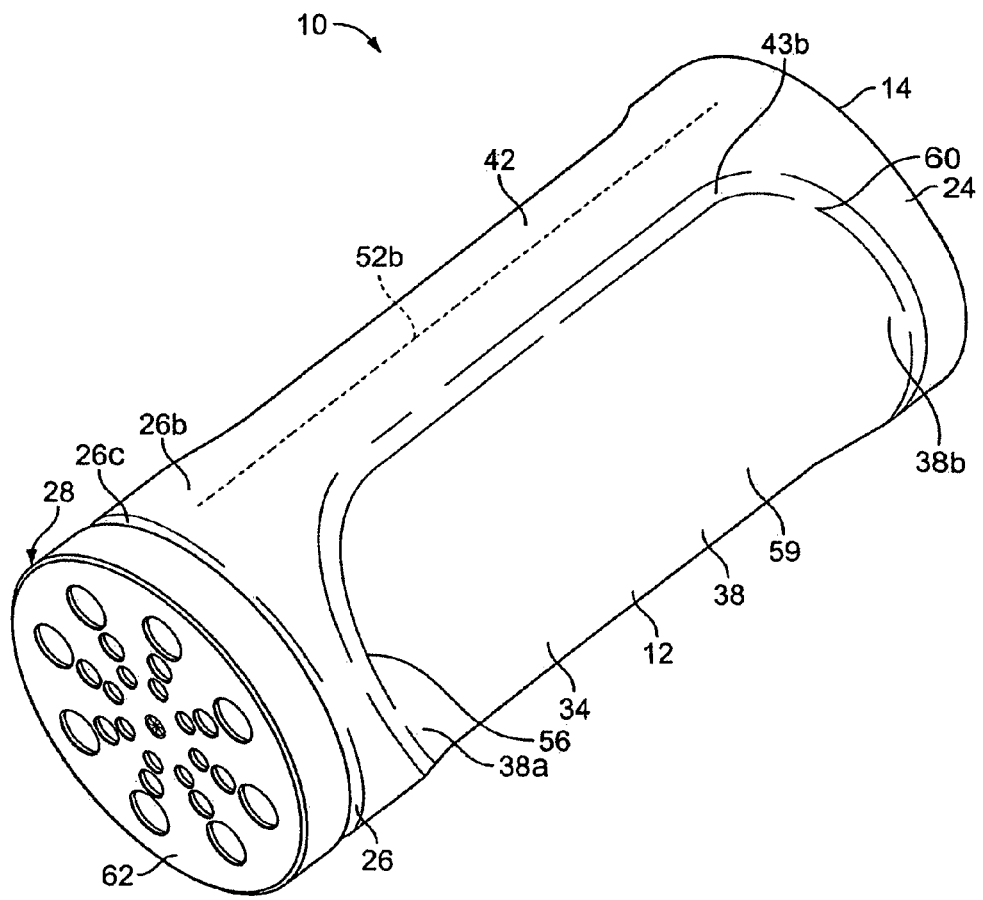
FIG. 6 is an isometric view of the container of FIG. 5 positioned in a dispensing position.

The container 10 is adapted to be held in a hand of a user. For purposes of describing the present container 10, same will be considered held when the container 10 is being solely supported through effort of the user, i.e., there is no additional support surface assisting in holding or supporting the container 10. Further, the container 10 may be held in a dispensing position or a non-dispensing position. One example of a non-dispensing position is depicted in FIG. 5, wherein the longitudinal axis 20 of the container 10 is perpendicular to the support surface 18 and the top end 16 of the container 10 faces upwardly. In the present embodiment the dispensing mechanism 28 comprises a one-piece lid 62 disposed on the top end 16 of the container 10. The lid 62 is retained on the container 10 by any suitable means, such as by an interference fit between an internal flange (not shown) and one or both of the annular ridges 32, and is sealed prior to initial use by a peel seal (not shown, but similar to the seal shown in subsequent FIGS. 15 and 15A) The lid 62 has a shape and arrangement of orifices therein as described subsequently in conjunction with an outer portion similar to that of a lid 62a shown in FIGS. 11 and 11A hereinafter. If desired, the dispensing mechanism 28 may comprise any other structure known to those skilled in the art that assists in the dispensing of product stored in a container. The degree to which the container 10 can be rotated from the position depicted in FIG. 5 to maintain the container 10 in a non-dispensing position or to move the container 10 into a dispensing position is dependent on several factors, such as the volume of product within the container 10, the flowability of the product, and/or the geometry of the dispensing mechanism, among other factors. FIG. 6 depicts the container 10 in a dispensing position.

Figure 7:
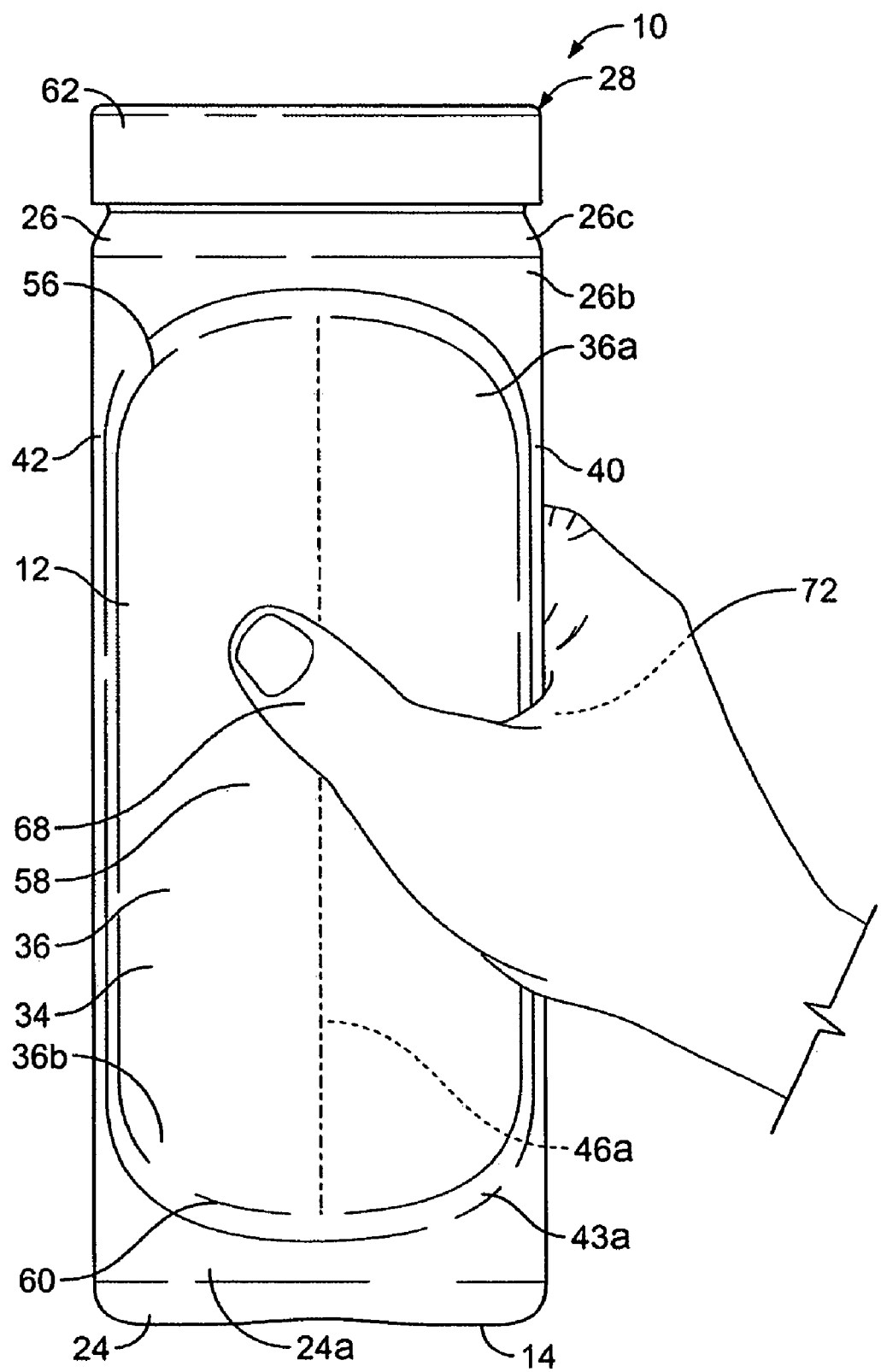
FIG. 7 is a front elevational view of the container of FIG. 5 further illustrating a hand holding the container in a first holding condition.
Figure 8:
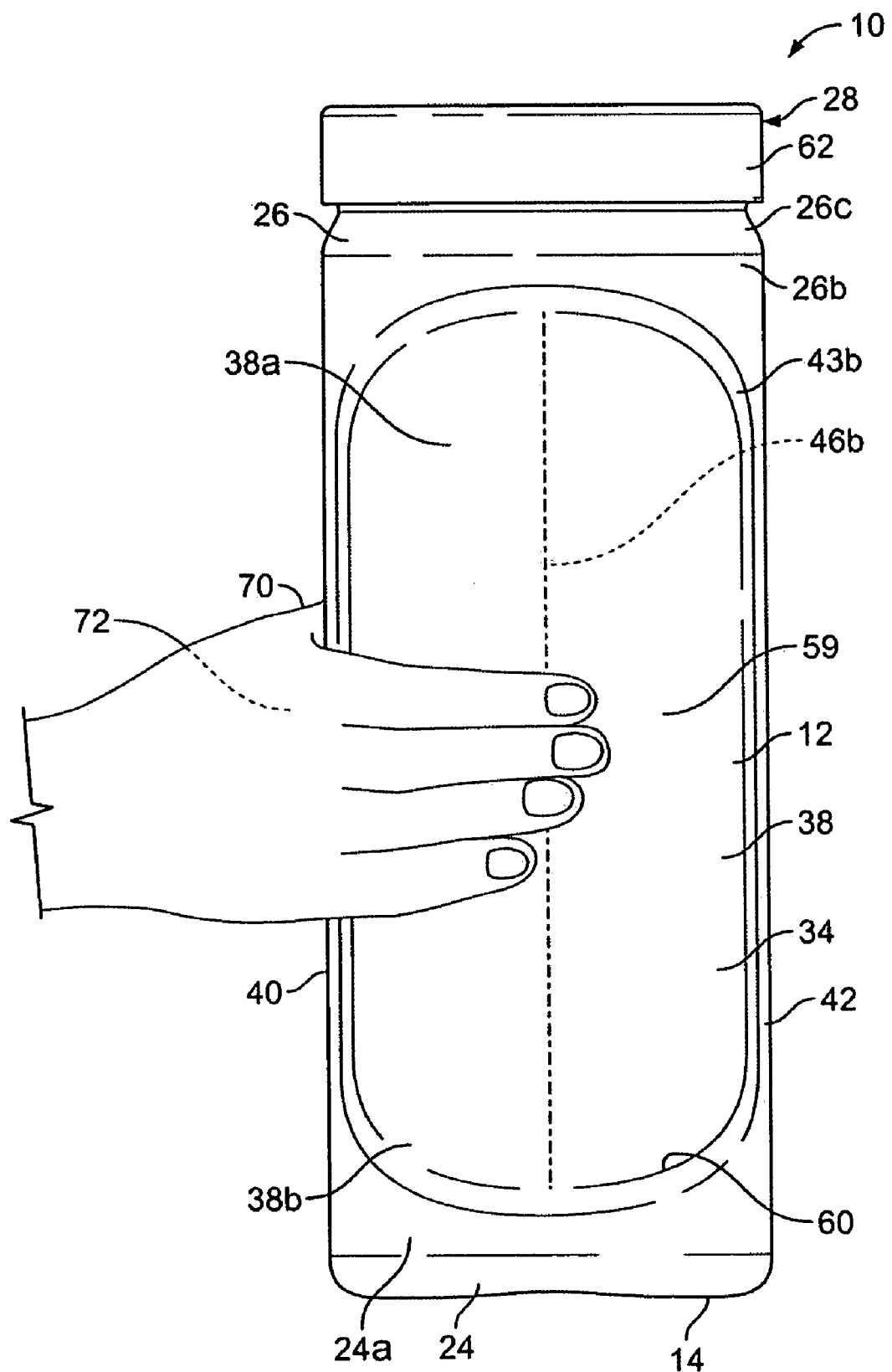
FIG. 8 is a rear elevational view of the container illustrating the gripping by the hand as shown in FIG. 7.

Typically, the user holds the container 10 in either a first holding condition or a second holding condition regardless of whether the container 10 is in a dispensing or non-dispensing position. One example of the first holding condition is depicted in FIGS. 7 and 8. FIG. 7 depicts a thumb 68 of the user's hand being held against the front surface 36. All or a portion of the thumb 68 extends over the longitudinal center 46a of the front surface 36. FIG. 8 depicts at least one finger 70 of the user's hand being held against the rear surface 38. All or a portion of the finger(s) 70 extend over the longitudinal center 46b of the rear surface 38. If desired, the user may hold the container such that the thumb 68 is in contact with the rear surface 38 and the finger(s) are in contact with the front surface 36. A palm 72 of the user's hand is disposed adjacent or against the first side surface 40 or the second side surface 42 (FIGS. 7 and 8 illustrate that the palm 72 is adjacent or in contact with the first side surface 40). When a user holds the container 10 in the first holding condition so that the container 10 is in a non-dispensing position such as shown in FIG. 5, the thumb 68 and finger(s) 70 exert transverse forces against the respective surfaces of the container 10 to resist longitudinal forces that are developed due to the combined weight of the container 10 and the product therein. When a user holds the container 10 in the dispensing position depicted in FIG. 6, the thumb 68 and finger(s) 70 similarly exert transverse forces against the respective surfaces of the container 10 to resist transverse forces developed by the weight of the container 10 and the product therein. Typically, although not exclusively, the transverse forces exerted by the thumb 68 and the at least one finger 70 are greater on a side of the longitudinal centers 46a, 46b of the front and rear surfaces 36, 38 adjacent the second side surface 42 in both the dispensing and non-dispensing positions. Transverse forces may also be exerted by the palm 72 against the first side surface 40 (or the second side surface 42) and/or portions of the front and rear surfaces 36, 38.

Figure 9:
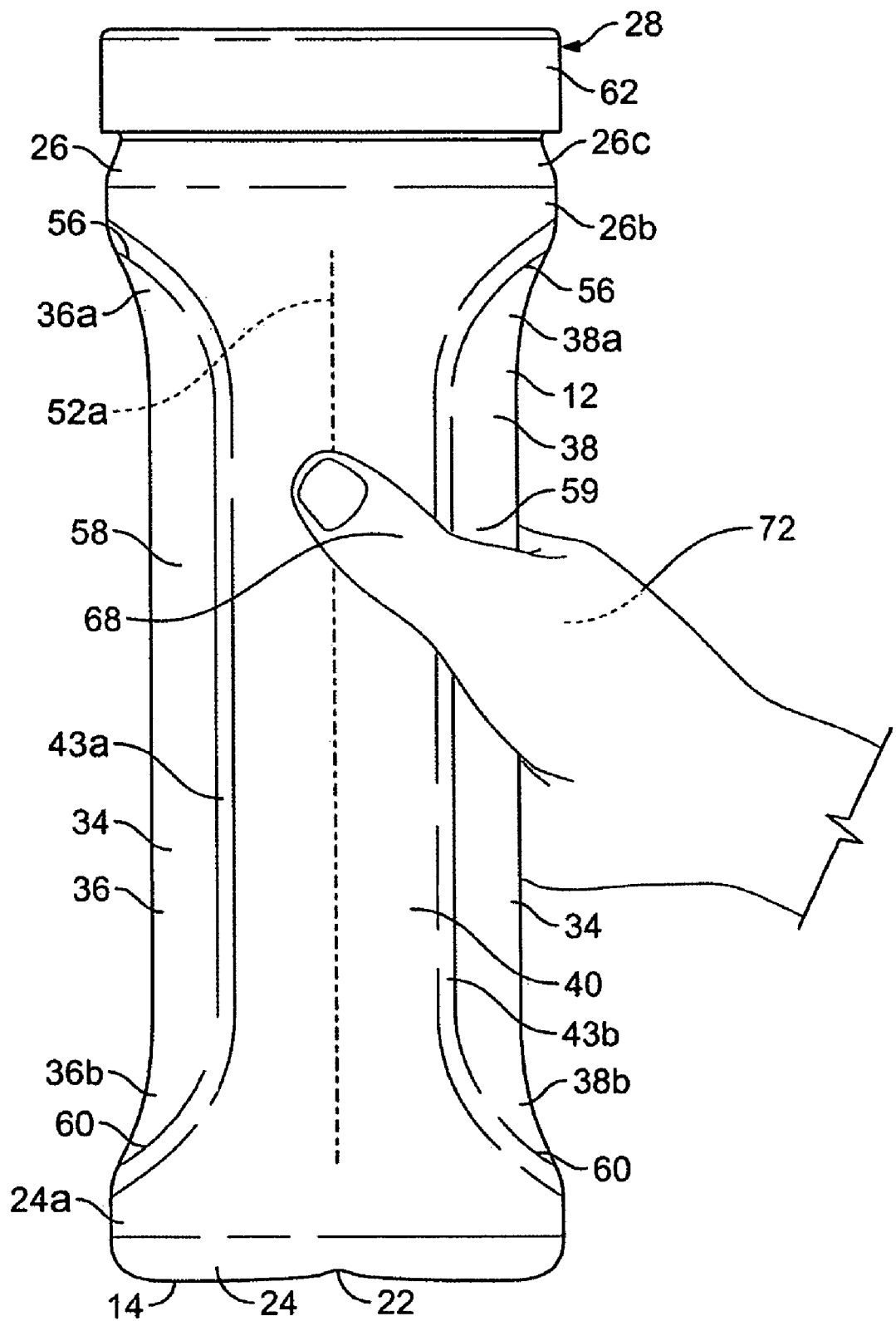
FIG. 9 is a left side elevational view of the container of FIG. 5 further illustrating a hand holding the container in a second holding condition.
Figure 10:
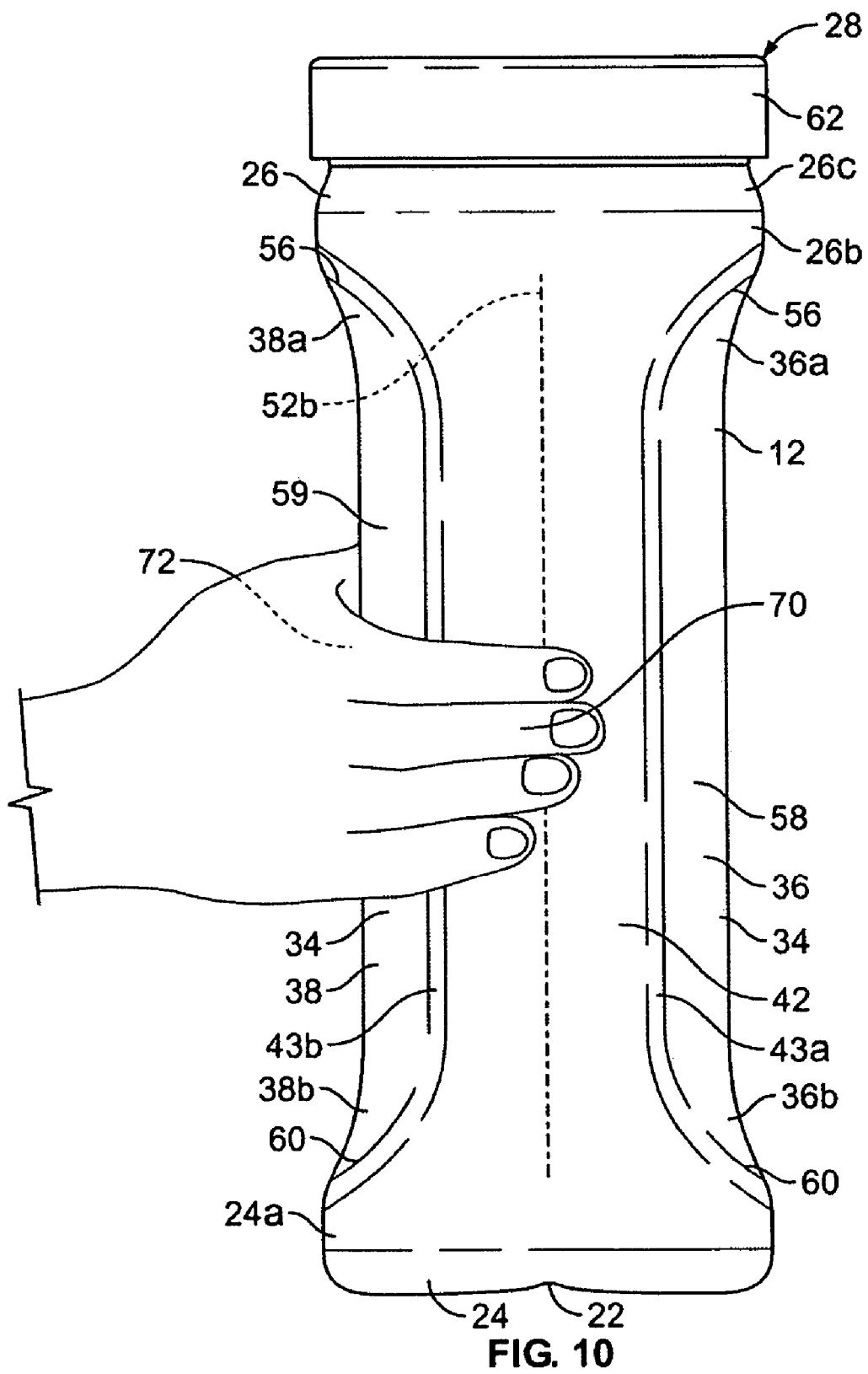
FIG. 10 is a right side elevational view of the container illustrating the gripping by the hand as shown in FIG. 9.

An example of the second holding condition is depicted in FIGS. 9 and 10. FIG. 9 depicts the thumb 68 of the user's hand being held against the first side surface 40. All or a portion of the thumb 68 extends over the longitudinal center 52a of the first side surface 40 and onto a portion of the front surface 36. FIG. 10 depicts the at least one finger 70 of the user's hand being held against the second side surface 42. All or a portion of the finger(s) 70 extend over the longitudinal center 52b of the second side surface 42 and onto a different portion of the front surface 36. If desired, the user may hold the container 10 such that the thumb 68 is in contact with the second side surface 42 and the finger(s) 70 are in contact with the first side surface 40. The palm 72 of the user's hand is disposed adjacent or against the front surface 36 or the rear surface 38 (FIGS. 9 and 10 illustrate that the palm 72 is adjacent or in contact with the rear surface 38). When a user holds the container 10 in the second holding condition so that the container 10 is in the non-dispensing position of FIG. 5, the thumb 68 and finger(s) 70 exert transverse forces against the respective surfaces of the container 10 to resist longitudinal forces that are developed due to the combined weight of the container 10 and the product therein. Similarly, when a user holds the container 10 in the dispensing position depicted in FIG. 6, the thumb 68 and finger(s) 70 exert transverse forces against the respective surfaces of the container 10 to resist transverse forces developed by the weight of the container and the product therein. Typically, although not exclusively, the transverse forces exerted by the thumb 68 and the at least one finger 70 are greater on a side of the longitudinal centers 52a, 52b of the first and second surfaces 40, 42 and one of the front and rear surfaces 36, 38 that are farther from the palm 72 of the user's hand in both the dispensing and non-dispensing positions. Transverse forces may also be exerted by the palm 72 against the rear surface 38 (or the front surface 36) and/or portions of the first and second side surfaces 40, 42.

The first and second holding conditions provide for enhanced gripping characteristics in both the non-dispensing and the dispensing positions. In either case the user must exert a sufficient amount of transverse force to develop enough friction to resist the longitudinal and/or transverse forces tending to cause the container 10 to slip. In one instance, the thumb 68 and the at least one finger 70 exert a transverse force that presses the container 10 adjacent the palm of the user's hand 72. Alternatively, the container 10 may be held exclusively by the thumb 68 and finger(s) 70 without any other portion of the hand in contact with the container 10.

When the user's hand is rotated from the non-dispensing position of FIG. 5 to the dispensing position of FIG. 6 the user may not have to exert the same magnitude of forces that are exerted when holding the container 10 in the non-dispensing position. This may occur because the user may extend his or her thumb 68 and at least one finger 70 around the longitudinal centers 46a, 46b in the first holding condition or around the longitudinal centers 52a, 52b and onto the front surface 36 in the second holding condition to cup and hold the container 10. Such action may cause the container 10 to move into more intimate engagement with the user's hand, thereby increasing the contact surface area and the friction developed between the user's hand and the container 10, in turn reducing the amount of force that must be exerted by the user to hold the container 10. When the user's hand is rotated between the non-dispensing position of FIG. 5 and the dispensing position of FIG. 6, the force components exerted by the user against the container 10 may vary depending upon the angle the container 10 is displaced from the position of FIG. 6.

The container 10 may alternatively be held by the user so that the thumb 68 and the at least one finger 70 are positioned between the first and second holding conditions. In this case, the thumb 68, the at least one finger 70, and, possibly, the palm of the hand 72 may exert forces against various portions of the gripping portion 34. However, regardless of how the user holds the container, at least one of the thumb 68 or the at least one finger 70 extends over one of the longitudinal centers 46a, 46b, 52a, 52b or over an end of one of the first or second side surfaces 40, 42 onto an adjacent front or rear surface 36, 38. It is believed that the provision of gripping portions, such as in the present embodiment or the other embodiments discussed herein with these physical characteristics enhances the gripability of containers as compared with conventional containers.

Figure 11:
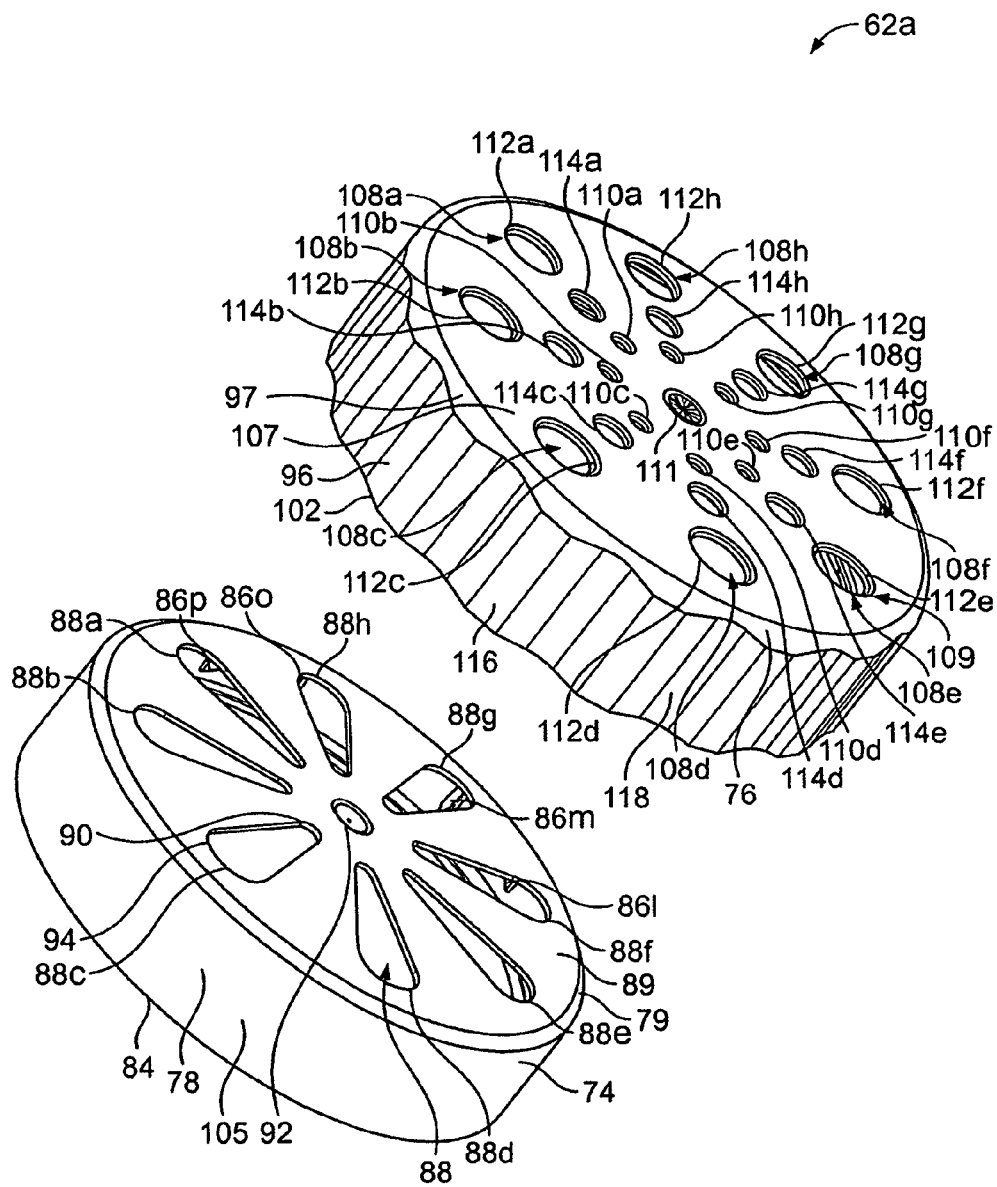
FIG. 11 is an exploded upper isometric view of a dispensing mechanism similar to the one depicted in FIG. 5.
Figure 11A:
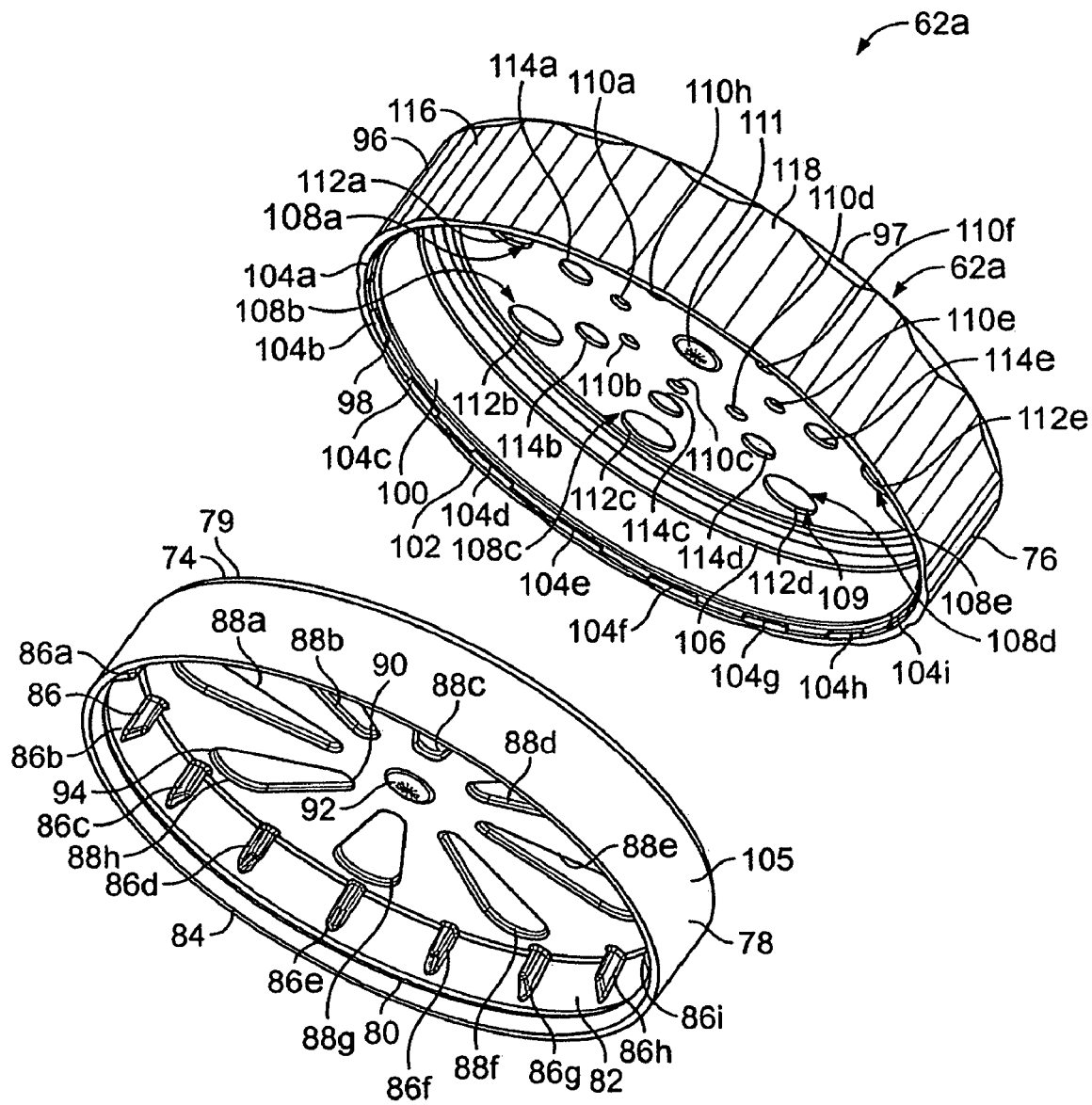
FIG. 11A is an exploded lower isometric view of a dispensing mechanism similar to the one depicted in FIG. 5.

FIGS. 11 and 11A illustrate a lid 62a, which is similar to the lid 62 depicted in FIGS. 5-10. The lid 62a comprises an inner lid 74 and an outer lid 76. The inner lid 74 is circular and includes an inner skirt 78 that depends from an outer periphery 79 thereof. A locking member 80 (FIG. 11A) extends circumferentially around an inner wall 82 of the skirt 78 adjacent a bottom lip 84 thereof. The locking member 80 is sized to fit within a groove formed between the two rounded ridges 32 that extend circumferentially around the top end 16 of the container 10, thereby providing a snap-fit connection to retain the lid 62a on the container 10. Further, tabs 86 (86a-86p) are spaced circumferentially around the inner wall 82 above the locking member 80 and extend radially inward. The tabs 86 are disposed in interfering relationship with the projections 30 and prevent substantial rotational movement of the inner lid 74 when same is mounted on the container 20. Preferably, there are sixteen equally spaced tabs 86a-86p.

The inner lid 74 includes several orifices 88 extending through a dispensing surface 89 and preferably equidistantly spaced in a radial pattern. In the illustrated embodiment eight orifices 88a-88h are provided. Each orifice 88 is defined by a first curved end 90 adjacent a center 92 of the inner lid 74, a second curved end 94 adjacent the outer periphery 79 of the inner lid 74, and two straight tapering side portions connecting the ends 90, 94. The second curved end 94 of the orifices 88 defines a wider opening than the first curved end 90 so that each orifice 88a-88h is substantially wedge-shaped. Preferably, the first curved end 90 has a radius of curvature of about 0.065 in. (0.165 cm), the second curved end 94 has a radius of curvature of about 0.170 in. (0.432 cm), and the two side portions have a length of about 0.857 in. (2.177 cm).

The outer lid 76 is also circular and includes an outer skirt 96 that depends from an outer periphery 97 thereof. A retaining bead 98 extends circumferentially around an inner wall 100 of the skirt 96 adjacent a bottom end 102 thereof. Sixteen equidistantly spaced cut-out portions 104a-104p are provided in the retaining bead 98. The outer lid 76 is sized so that the inner lid 74 may be snugly disposed therein while at the same time permitting relative rotation therebetween. When the inner lid 74 is disposed within the outer lid 76, the retaining bead 98 is disposed beneath and engages the bottom lip 84 of the inner lid 74 in interfering relationship therewith to capture the inner lid 74 within the outer lid 76. Further, an outer wall 105 of the inner lid 74 is held adjacent the inner wall 100 of the outer lid 76. The cut-out portions 104a-104p of the retaining bead 98 allow a user to easily grasp the outer lid 76 and pull same apart from the inner lid 74. The removability of the outer lid 76 from the inner lid 74 is facilitated by the tapered portion 26c of the container 10 that narrows toward the top end 16 of the container, thereby providing a space for a user to place his or her fingers underneath the lid 62a to remove the outer lid 76. A second bead 106 also extends circumferentially around the inner wall 100 of the skirt 96 above the retaining bead 98. The second bead 106 acts as a seal to prevent solid product disposed within the container 10 from escaping between the walls 100, 105. Further, when the inner lid 74 is disposed within the outer lid 76, the outer lid 76 is rotatable about the inner lid 74 in either a clockwise or counter-clockwise direction. Preferably, the inner and outer lids 74, 76 are rotatable a full 360° relative to one another. The relatively small size of the second bead 106 provides a small enough contact area with the outer wall 105 of the inner lid 74 that the rotation of the outer lid 76 thereabout is not substantially hindered and the flexure of the outer lid 76 to remove same from the inner lid 74 is not greatly inhibited.

A dispensing surface 107 of the outer lid 76 includes several radially-extending rows 108 of equidistantly spaced holes 109. The several rows 108 of equidistantly spaced holes 109 are symmetrically disposed about the longitudinal axis 20 when the outer lid 76 is mounted on the container 10. In the present embodiment there are eight rows 108a-108h of equidistantly spaced holes 109. Each row 108a-108h of spaced holes 109 includes a proximal circular hole 110a-h, respectively, disposed adjacent a center 111 of the outer lid 76. In one embodiment, each proximal hole 110 has a diameter between about 0.063 in. (0.160 cm) and about 0.250 in. (0.635 cm), and more preferably has a diameter of about 0.100 in. (0.254 cm). The centers of the proximal circular holes 110a-110h are preferably disposed about 0.438 in. (1.113 cm) from the center 111 of the outer lid 76. Each row 108a-108h of spaced holes 109 also includes a distal hole 112a-112h, respectively, disposed adjacent the outer periphery of the outer lid 76. In one embodiment, each distal hole 112 has a diameter between about 0.125 in. (0.318 cm) and about 0.750 in. (1.905 cm), and more preferably has a diameter of about 0.310 in. (0.787 cm). The centers of the distal holes 112a-112h are preferably disposed about 1.100 in. (2.794 cm) from the center 111 of the outer lid 76. In the present embodiment, each row 108a-108h of spaced holes 109 also includes a medial hole 114a-114h, respectively, disposed between the proximal and distal holes 110a-110h, 112a-112h, respectively. In one embodiment, each medial hole 114 has a diameter between about 0.063 in. (0.160 cm) and about 0.750 in. (1.905 cm), and more preferably has a diameter of about 0.180 in. (0.457 cm). The centers of the medial holes 114a-114h are preferably disposed about 0.700 in. (1.778 cm) from the center 111 of the outer lid 76. The described ranges are not intended to be limiting to the size or disposition of variously sized holes, but merely illustrative of one embodiment.

Figure 12:
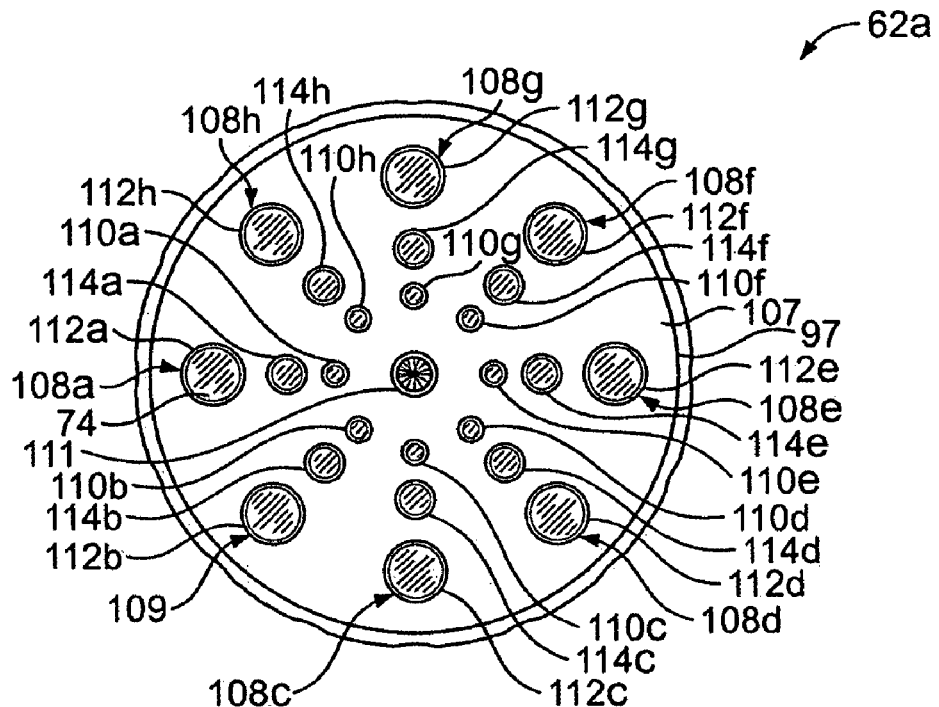
FIG. 12 is a plan view of the dispensing mechanism depicted in FIG. 11 in a closed position.
Figure 13:
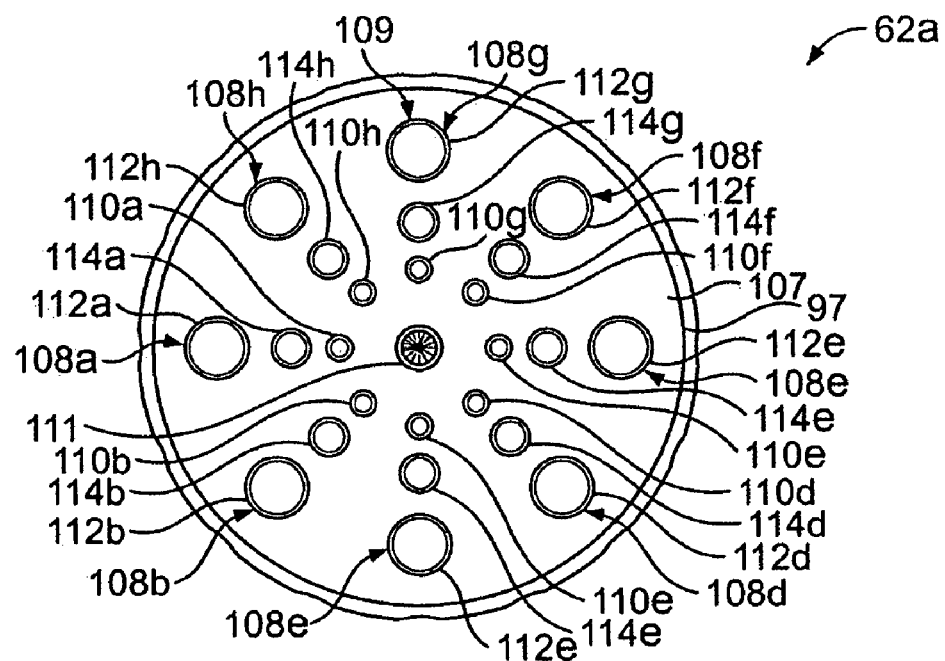
FIG. 13 is a plan view of the dispensing mechanism of FIG. 11 in an open position.
Figure 14:
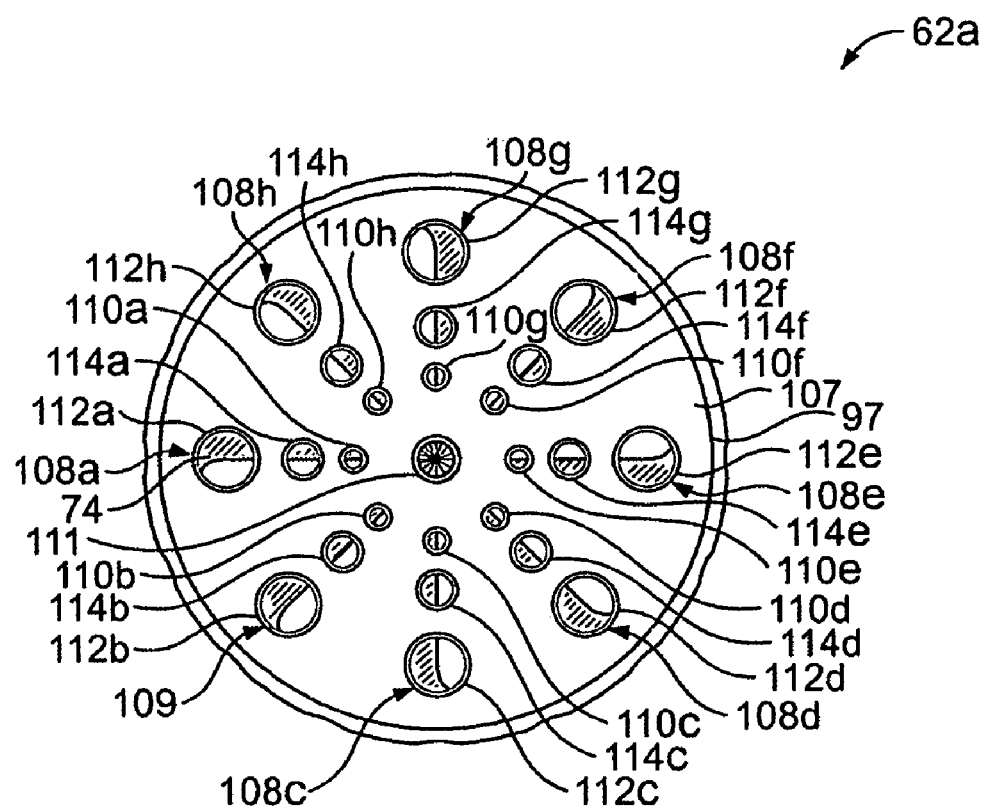
FIG. 14 is a plan view of the dispensing mechanism of FIG. 11 in a partially open position.

FIG. 12 depicts the outer lid 76 in a closed position, wherein the outer lid 76 has been rotated about the inner lid 74 so that the rows 108a-108h of spaced holes 109 are not aligned with the orifices 88a-88h of the inner lid 74. Therefore, there is no path of egress for product through the rows 108a-108h of spaced holes 109 and the respective orifices 88a-88h. FIG. 13 depicts the outer lid 76 in an open position, wherein the outer lid 76 has been rotated about the inner lid 74 so that the rows 108*a*-108*h* of spaced holes 109 are completely unobstructed and aligned with the orifices 88*a*-88*h* of the inner lid 74. Therefore, a path of egress for product through the rows 108*a*-108*h* of spaced holes 109 and the respective orifices 88*a*-88*h* is defined. FIG. 14 depicts the outer lid 76 in a partially open position, wherein the rows 108*a*-108*h* of spaced holes 109 are partially obstructed by the inner lid 74 and partially aligned with the orifices 88*a*-88*h*. A partial path of egress for product is defined by the partial alignment of the rows 108*a*-108*h* of spaced holes 109 and the respective orifices 88*a*-88*h*. The outer lid 76 is rotated about the inner lid 74 by grasping the outer lid 76 and rotating same in either a clockwise or counter-clockwise direction. In the embodiment depicted in FIGS. 11 and 11A, an outer wall 116 of the outer lid 76 is provided with several equidistantly spaced scalloped portions 118 that can be gripped by a user to assist in the rotation of the outer lid 76. In the present embodiment sixteen scalloped portions 118 are provided. Similar to the retaining bead 98, the scalloped portions 118 also provide flexibility to assist in the removal of the outer lid 86 from the inner lid 74. It is envisioned that numerous other inwardly or outwardly extending surfaces of various sizes and shapes may be provided with the embodiments described herein to assist a user in rotating the outer lid 76 and/or to assist in separation of the outer lid 76 from the inner lid 74.

The lid 62*a* may be constructed from any materials known to those skilled in the art. However, it has been found that constructing the outer lid 76 from polypropylene and the inner lid 74 from high density polyethylene provides for low friction between the two lids 74, 76 and allows the outer lid 76 to be readily turned about the inner lid 74. In the embodiment illustrated in FIGS. 11 and 11A, the lid 62*a*, and, in particular, the outer lid 76 is made of an opaque material.

Figure 15:
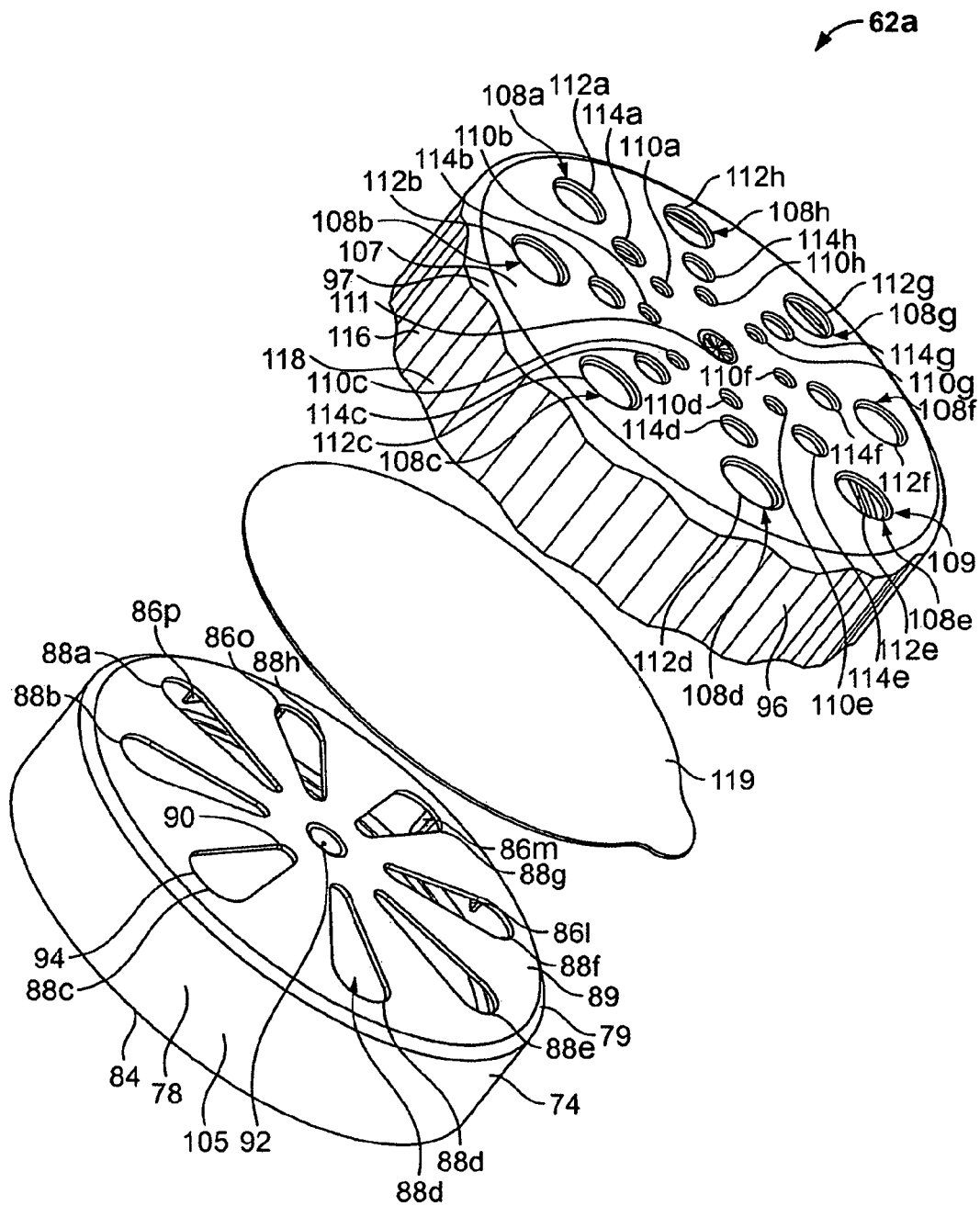
FIG. 15 is a view similar to FIG. 11 with the addition of a peel label.
Figure 15A:
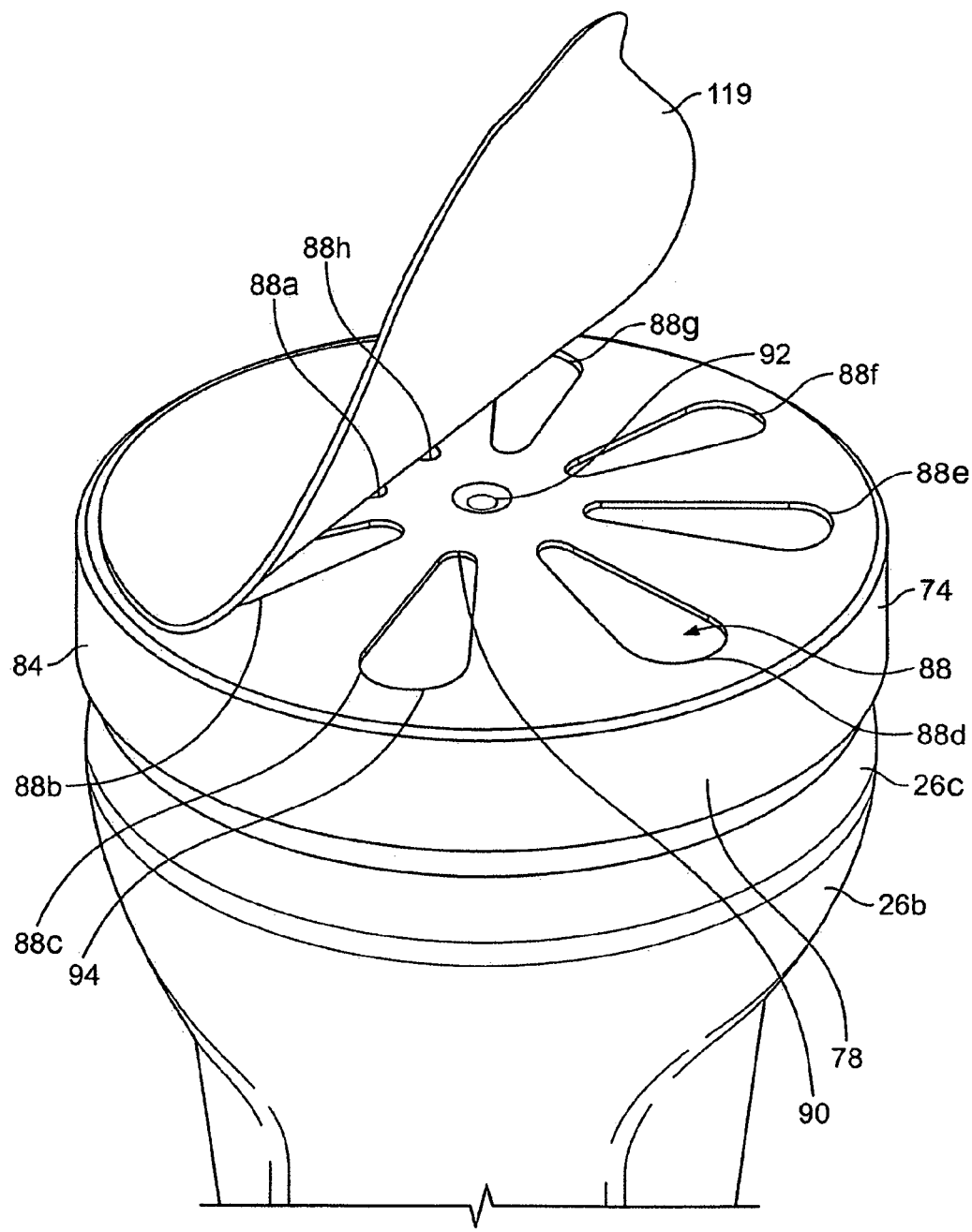
FIG. 15A is a view similar to FIG. 15 showing a portion of the dispensing mechanism with the peel label disposed thereon.

FIGS. 15 and 15A depict the lid 62*a* as having a peel seal in the form of a label 119 disposed over the inner lid 74. The peel seal may be of the type manufactured by Green Bay Packaging, Inc., 3250 South Ridge Road, P.O. Box 19017, Green Bay, Wis. 54307-9017, under the product name Adhesive 275. The presence of the label 119 provides an indication to the user that the container 10 and the contents therein have not been used or tampered with. Prior to initial use a user removes the label 119 by removing the outer lid 76 from the inner lid 74 and peeling the label 119 from the inner lid 74. The user thereafter replaces the outer lid 76 back over the inner lid 74.

Figure 16:
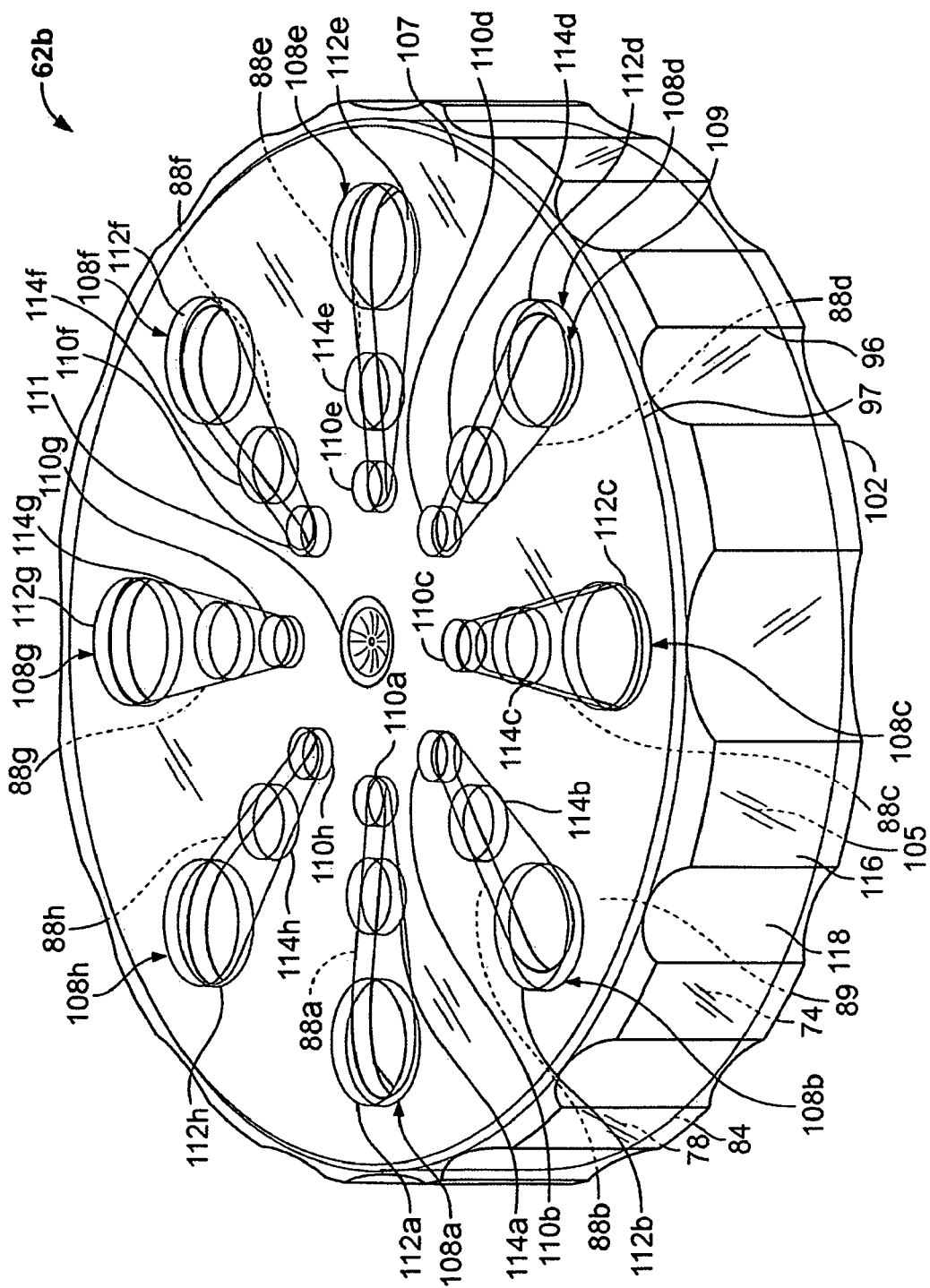
FIG. 16 is an isometric view of a dispensing mechanism similar to the one shown in FIG. 13 having an outer lid made of a transparent or translucent material.

FIG. 16 depicts a lid 62*b* similar in structure to the lid 62*a* shown in FIGS. 11-15 except that the outer lid 76 is made of a translucent or transparent material. A translucent or transparent outer lid 76 provides unique advantages not realized by other lids. In particular, the transparent or translucent outer lid 76 allows the user to readily observe the presence or absence of the peel seal 119 at the time of purchase of the container 10 and/or at initial use thereof. The user is thus able to determine whether there exists the possibility that the contents have been tampered with. In addition, the user is able at any time to accurately determine the relative positioning of the outer lid 76 and the inner lid 74. This results in the ability to accurately gauge the desired rotational position of the outer lid 76 to achieve a desired dispensing rate. In other embodiments, both the inner and outer lids 74, 76 are made of a translucent or transparent material or just the inner lid 74 is fabricated of a translucent or transparent material.

As noted above, the dispensing mechanism 28, and more particularly the lid 62, 62*a*, or 62*b*, is separable from the top end 16 of the container 10. Alternatively, a dispensing mechanism 28 may be provided that is either integral with or fixed to the top end 16 of the container 10. For example, a portion integral with or separate from and nonremovable from the top end 16 may include a plurality of orifices/apertures that are identical to, similar to, or different in geometry and number to either the spaced orifices 88*a*-88*h* or the rows 108*a*-108*h* of holes 109. Further, a separable dispensing mechanism 28 may be provided that comprises rotatable inner and outer annular portions having surfaces spanning thereacross that include a plurality of orifices/apertures that are identical to, similar to, or different in geometry and number to either the spaced orifices 88*a*-88*h* or the rows 108*a*-108*h* of holes 109. Alternatively, a different separable dispensing mechanism 28 with apertures or the like may be provided that is configured to be snap-fitted onto the top end 16, adhered thereon, latched onto the top end 16, screwed onto a complementary portion, or secured by any means known to those skilled in the art. Still further, the dispensing mechanism 28 may or may not comprise rotatable inner and outer lids or some closure mechanism for obstructing apertures of the dispensing mechanism 28. It is also contemplated that the number, size, and geometry of the apertures may be changed in any of the embodiments disclosed herein.

The dispensing mechanism 28, and more particularly the lid 62 or 62*a*, provides the container 10 with omnidirectional dispensing characteristics. In particular, the provision of the eight rows 108*a*-108*h* of equally spaced holes 109 in fully open or partially open positions allows the user to dispense the product from the container 10 in a uniform fashion regardless of the holding orientation. In fact, when the user holds the container 10 in a dispensing position, regardless of whether the container 10 is being held by the user in the first or second holding conditions, or any position therebetween, and all other things being equal (i.e., the same volume of product in the container 10, the same orientation of the rows 108*a*-108*h* of spaced holes 109 with respect to the orifices 88*a*-88*h*, the same angular displacement from the non-dispensing position of FIG. 6, the same shaking motion or force imparted to the container 10, etc.) substantially the same amount of product is dispensed per unit time through the dispensing mechanism 28. The omnidirectional dispensing characteristics of the dispensing mechanism 28 further provide the container 10 with enhanced gripping characteristics that are not found in conventional dispensers. Specifically, the user does not have to align his or her hand before picking the container 10 up or deal with any awkward reorientation of the container 10 that might cause more force or energy to be exerted.

The product disposed within an interior of the container body 12 is preferably a flowable solid substance such as the one disclosed in S. C. Johnson and Son, Inc. (U.S. patent application Ser. No. to be assigned), filed on the same day as the present application, the disclosure of which is herein incorporated by reference. However, the product may comprise any type of material that can be disposed within a container. In one embodiment, the flowable solid substance contains an effective amount of one or more odor-counteracting materials. The effective amount of the odor-counteracting material typically includes an amount sufficient to reduce the concentration of an undesirable odor from a textile or other material such that the level of the undesirable odor is reduced in the surrounding environment. In other embodiments, a solid product or powder is provided that may have odor-counteracting properties, deodorizing properties, fragrancing properties, or any other type of property found in a typical household product. It is also envisioned that the present container 10 may include other products not typically found in a household but that have similar flowing properties as the products discussed herein.

In one particular embodiment, the product disposed within the container 10 is a flowable granular composition. The average particle size of the granular composition based on the weight of the composition is within the range of about 5 microns to about 1500 microns. More particularly, the average particle size based on the weight of the composition is within the range of about 30 microns to about 800 microns. Further, the flowable granular composition typically exhibits a bulk density of between about 0.9 grams to about 1.8 grams per cubic centimeter. The properties of the product allow same to easily pass through the spaced holes 109 of the outer lid 76.

Figure 17:
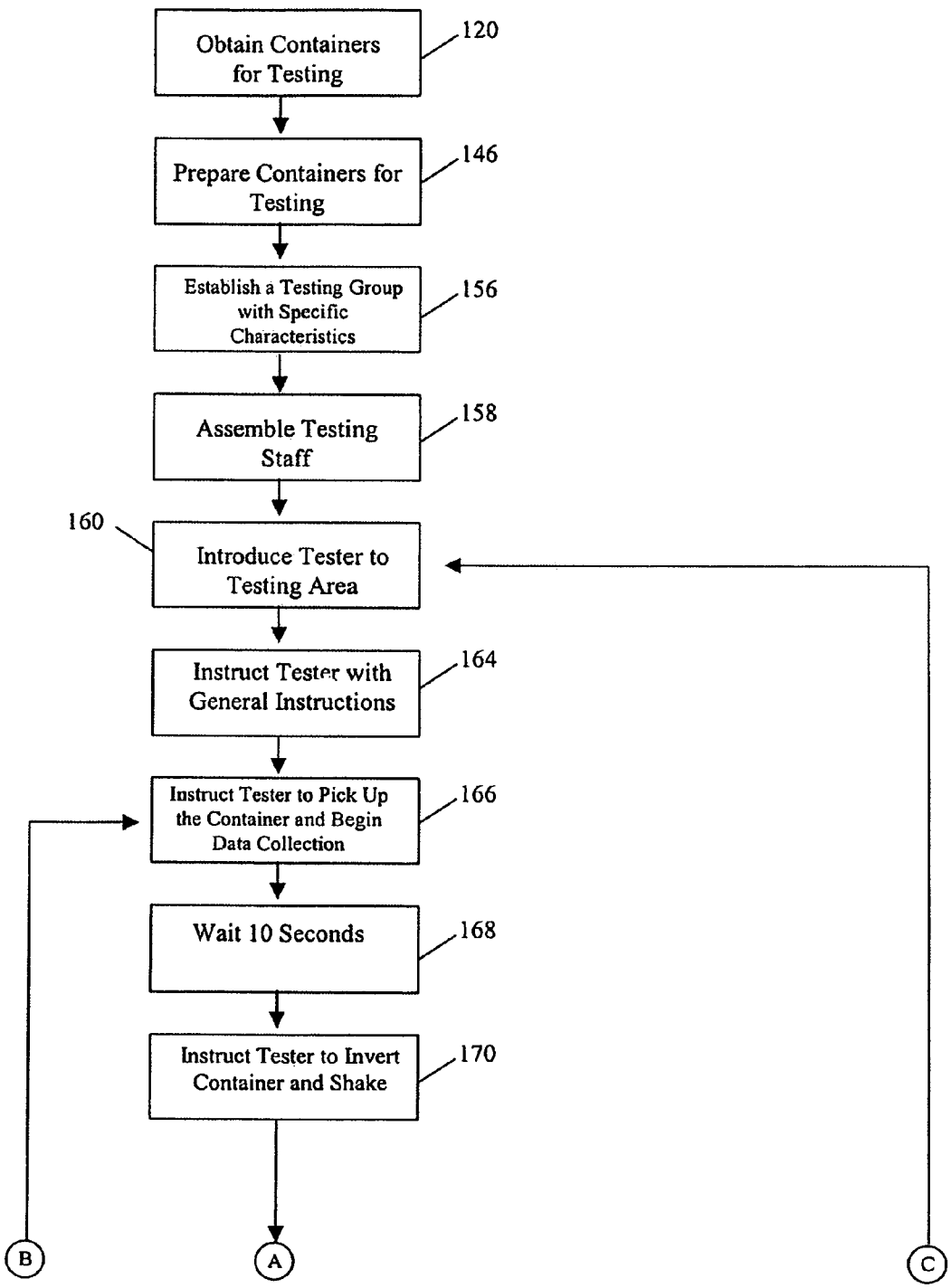
FIGS. 17 and 17A, when joined along similarly lettered lines, together comprise a flowchart illustrating a methodology for testing the interaction between a user's hand and a container.
Figure 17A:
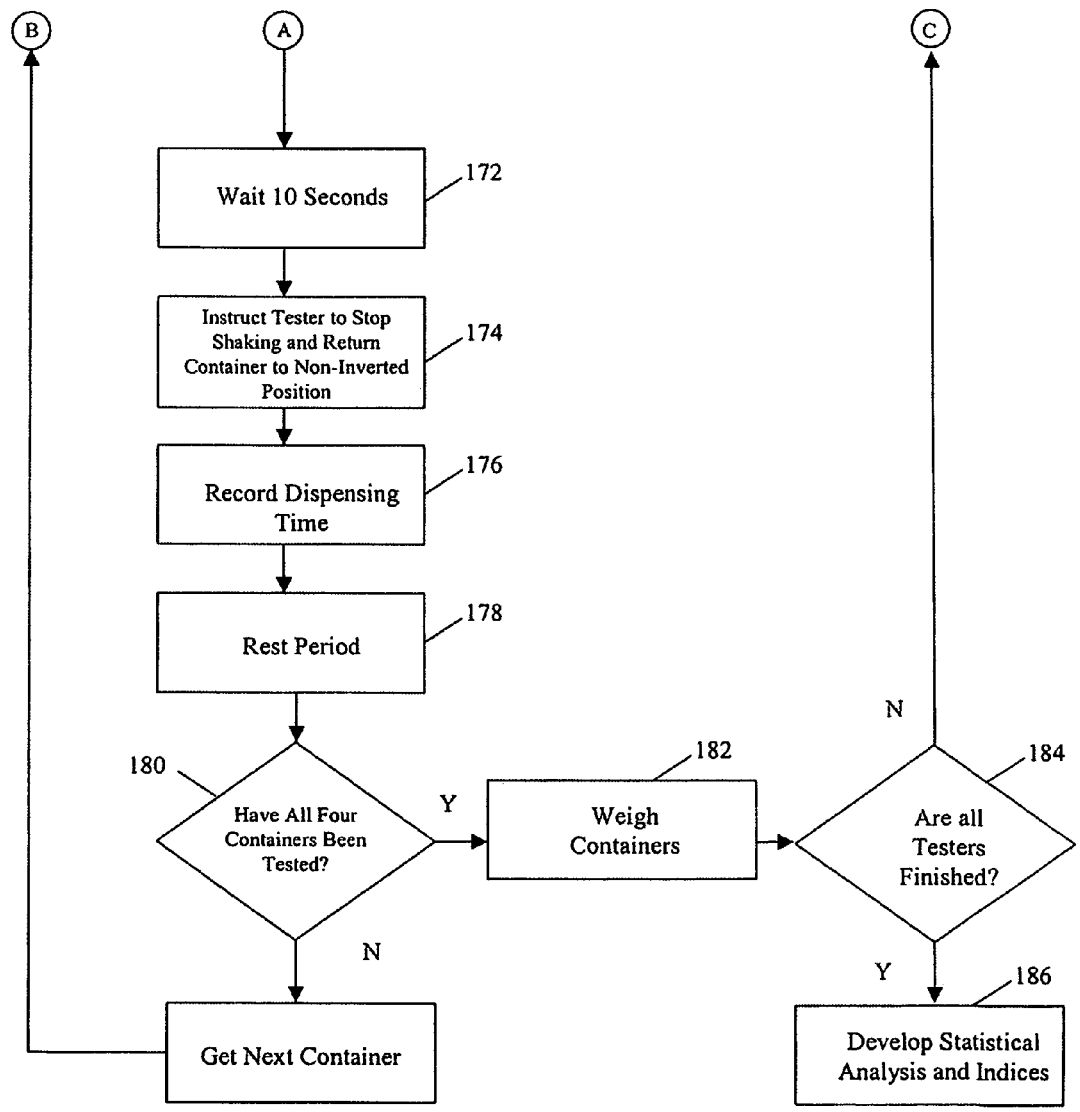
Figure 18:
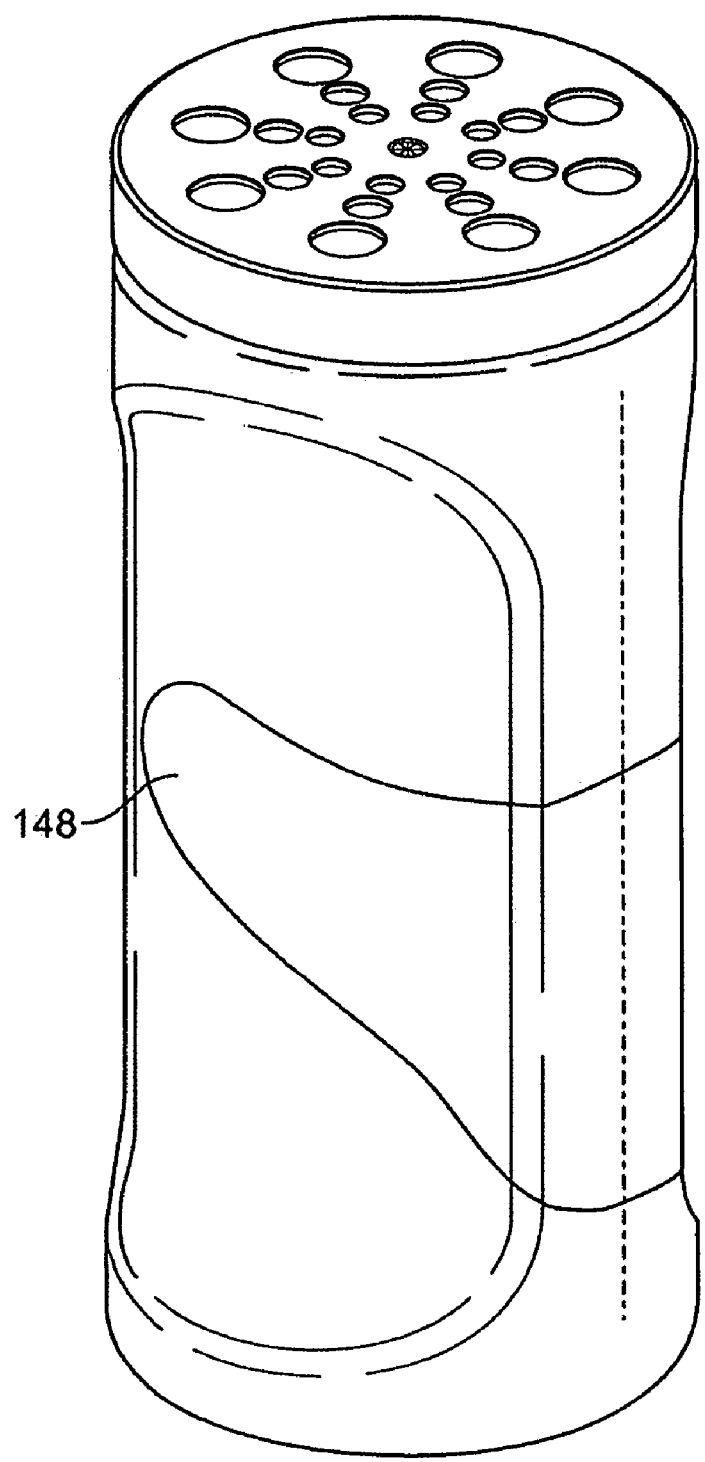
FIG. 18 is a view similar to FIG. 5 including a hand outline for holding the container in a first holding condition.
Figure 19:
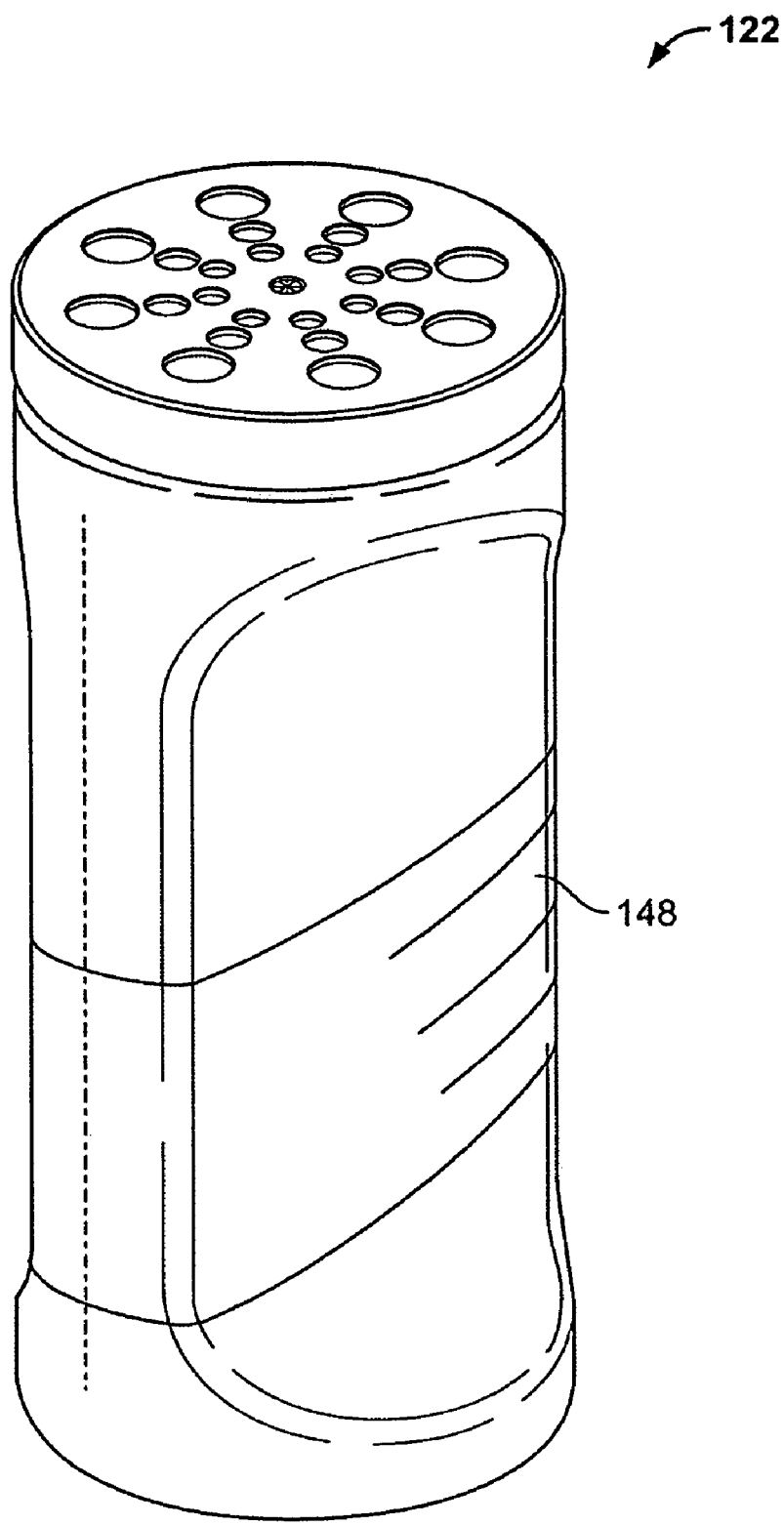
FIG. 19 depicts another isometric view of the container of FIG. 18.
Figure 20:
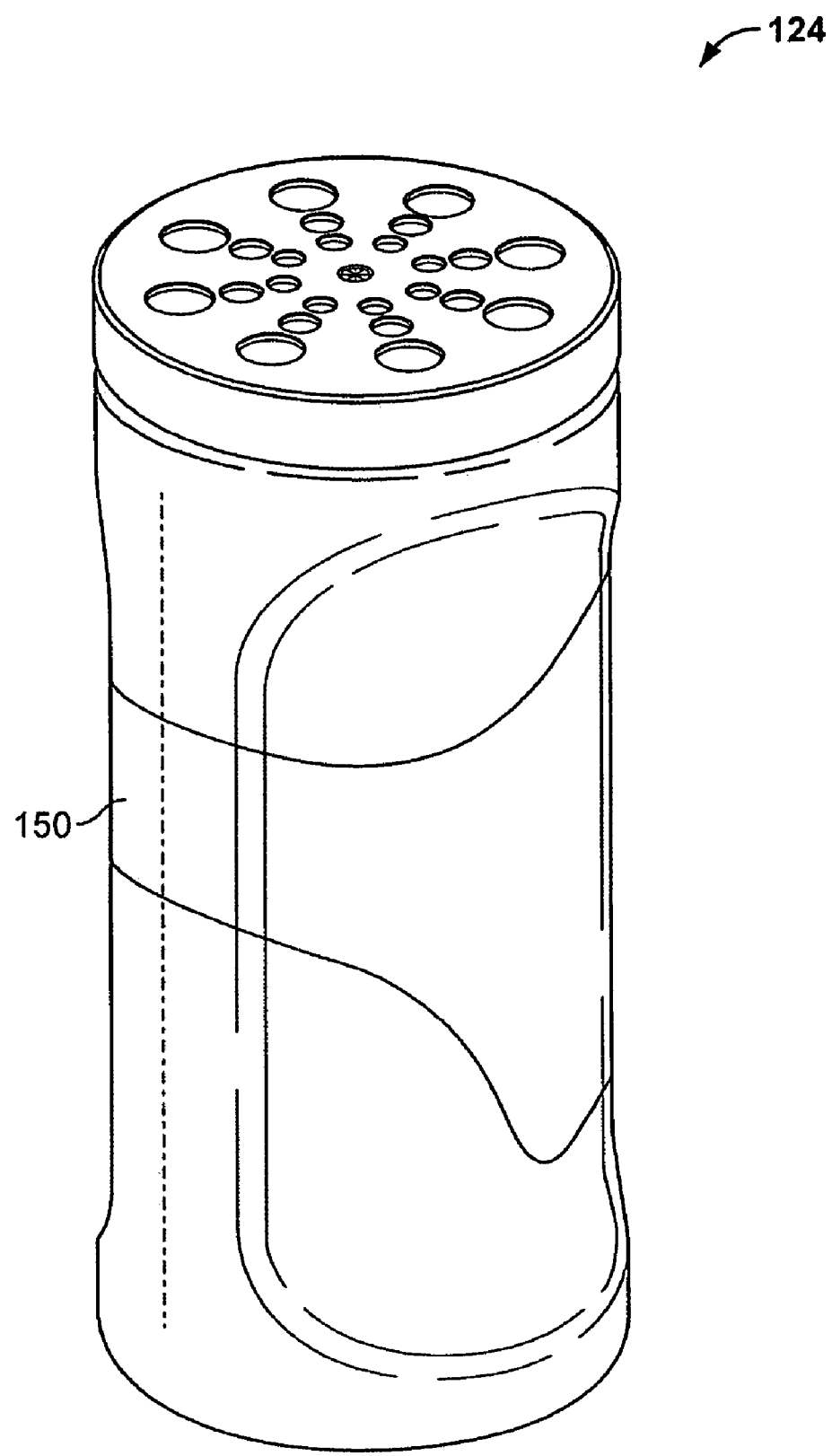
FIG. 20 is a view similar to FIG. 5 further including a hand outline for holding the container in a second holding condition.
Figure 21:
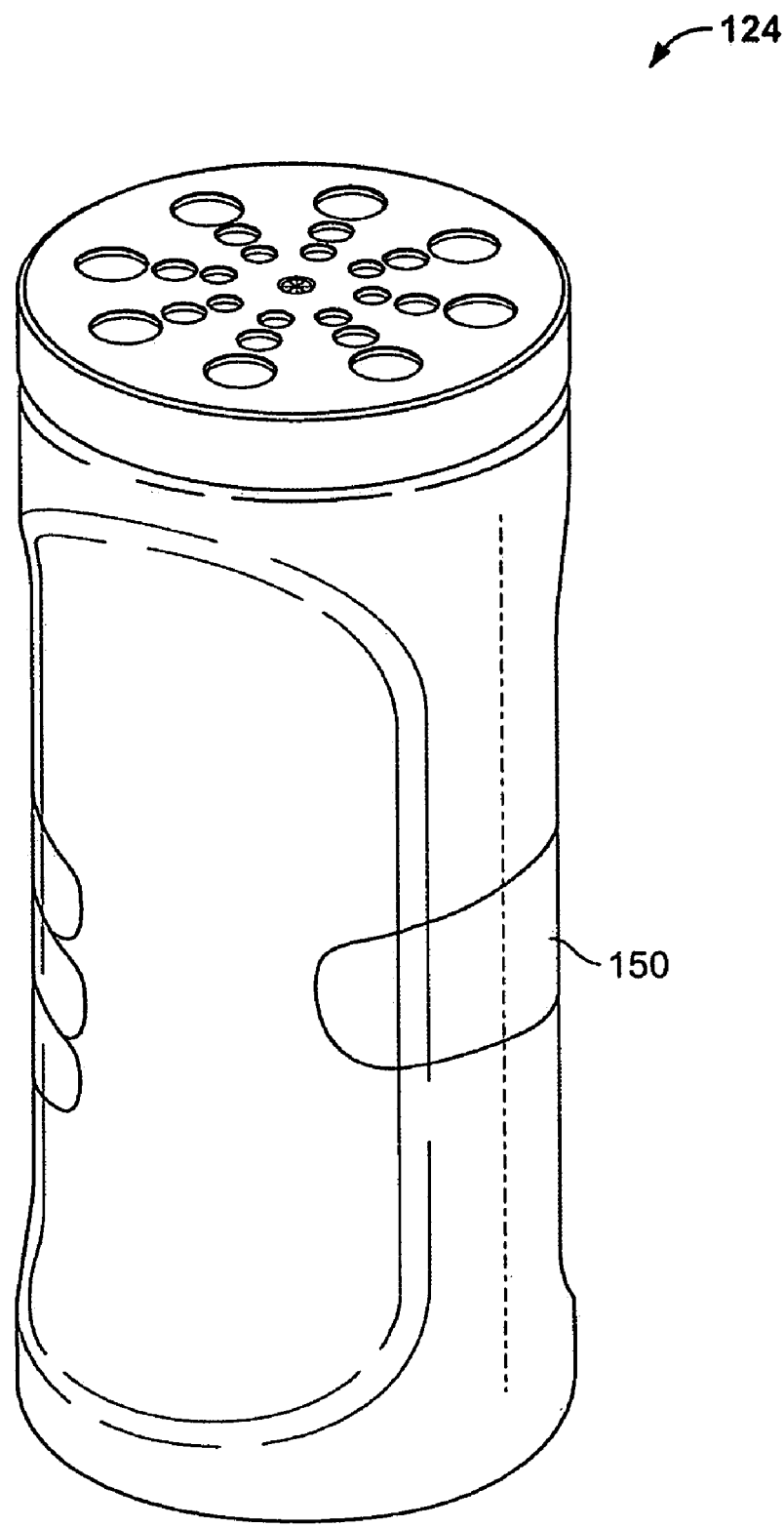
FIG. 21 depicts another isometric view of the container of FIG. 20.
Figure 22:
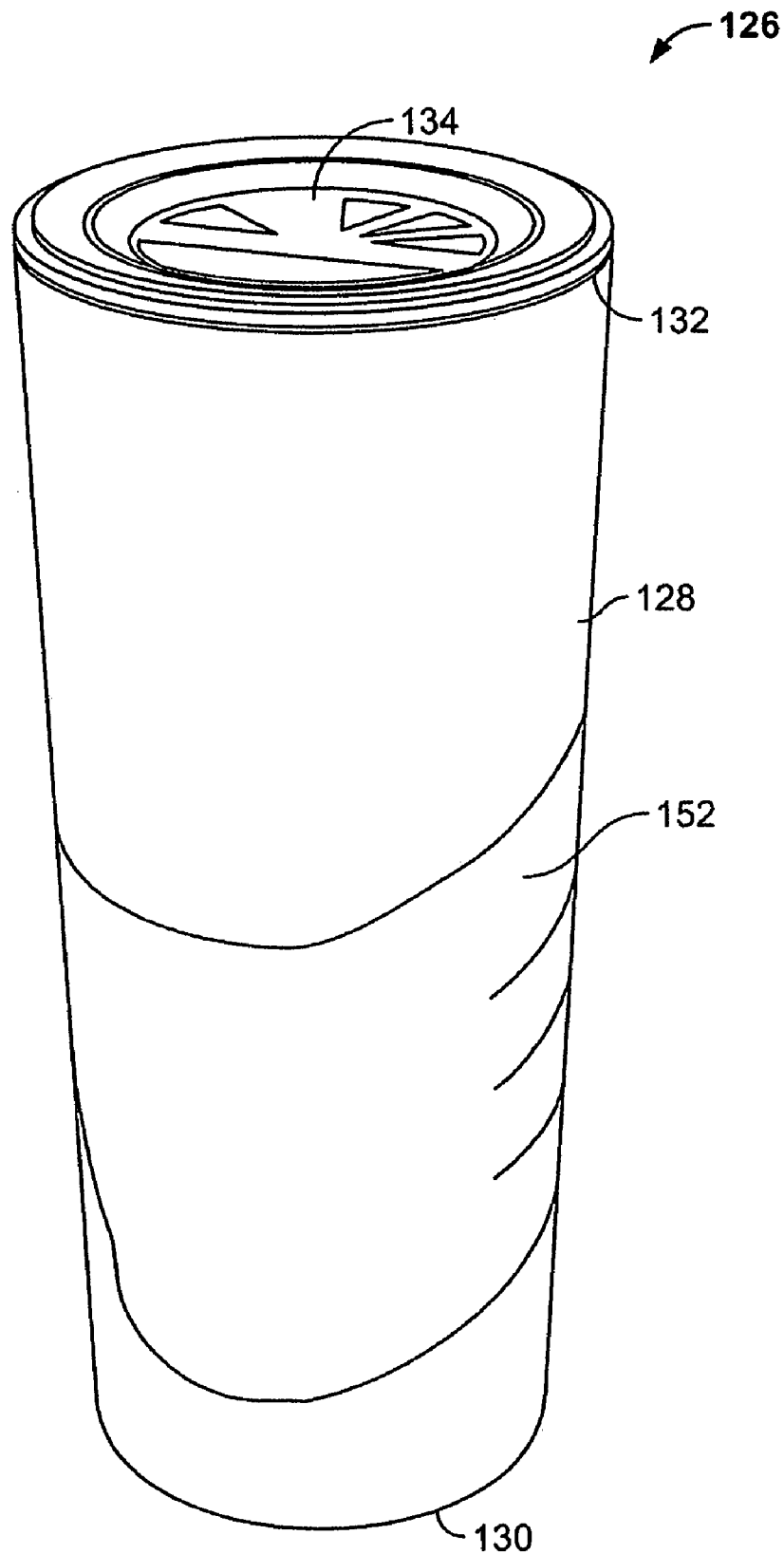
FIG. 22 is an isometric view of a cylindrical container illustrating a hand outline disposed thereon.
Figure 23:
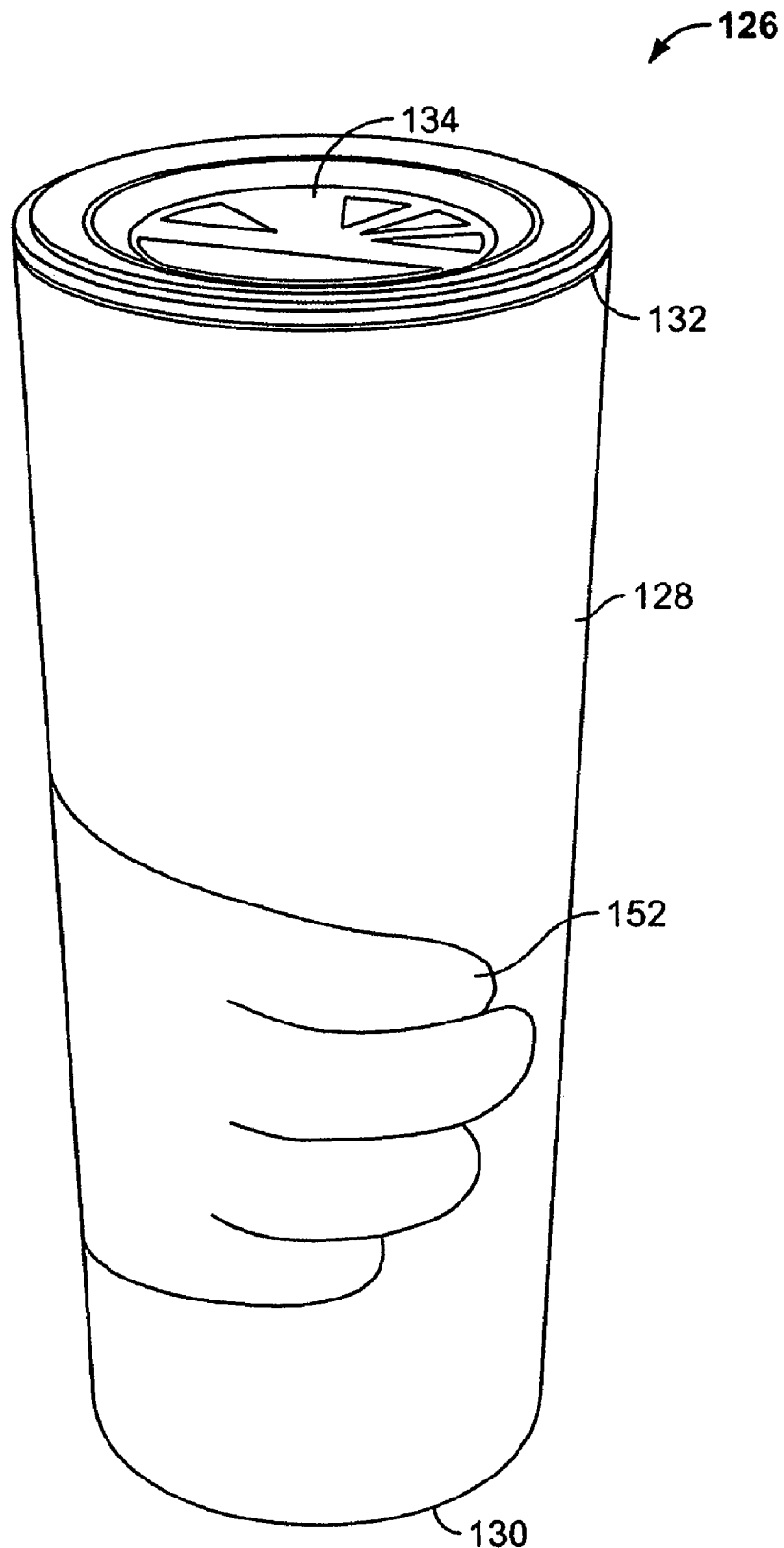
FIG. 23 depicts an isometric view of the container of FIG. 22 illustrating a side of the container opposite to that seen in FIG. 22.
Figure 24:
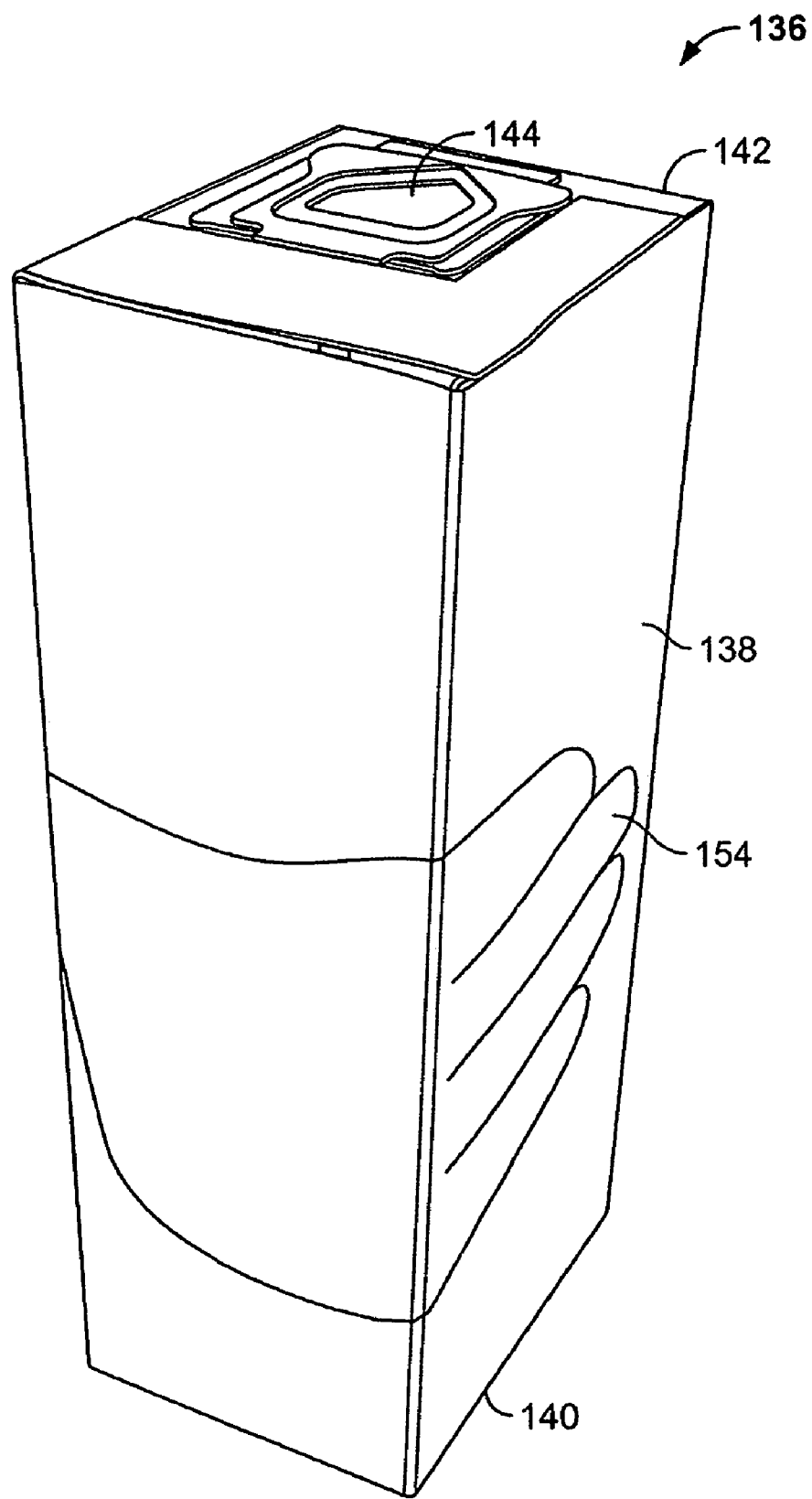
FIG. 24 is an isometric view of a rectangular container and a hand outline disposed thereon.
Figure 25:
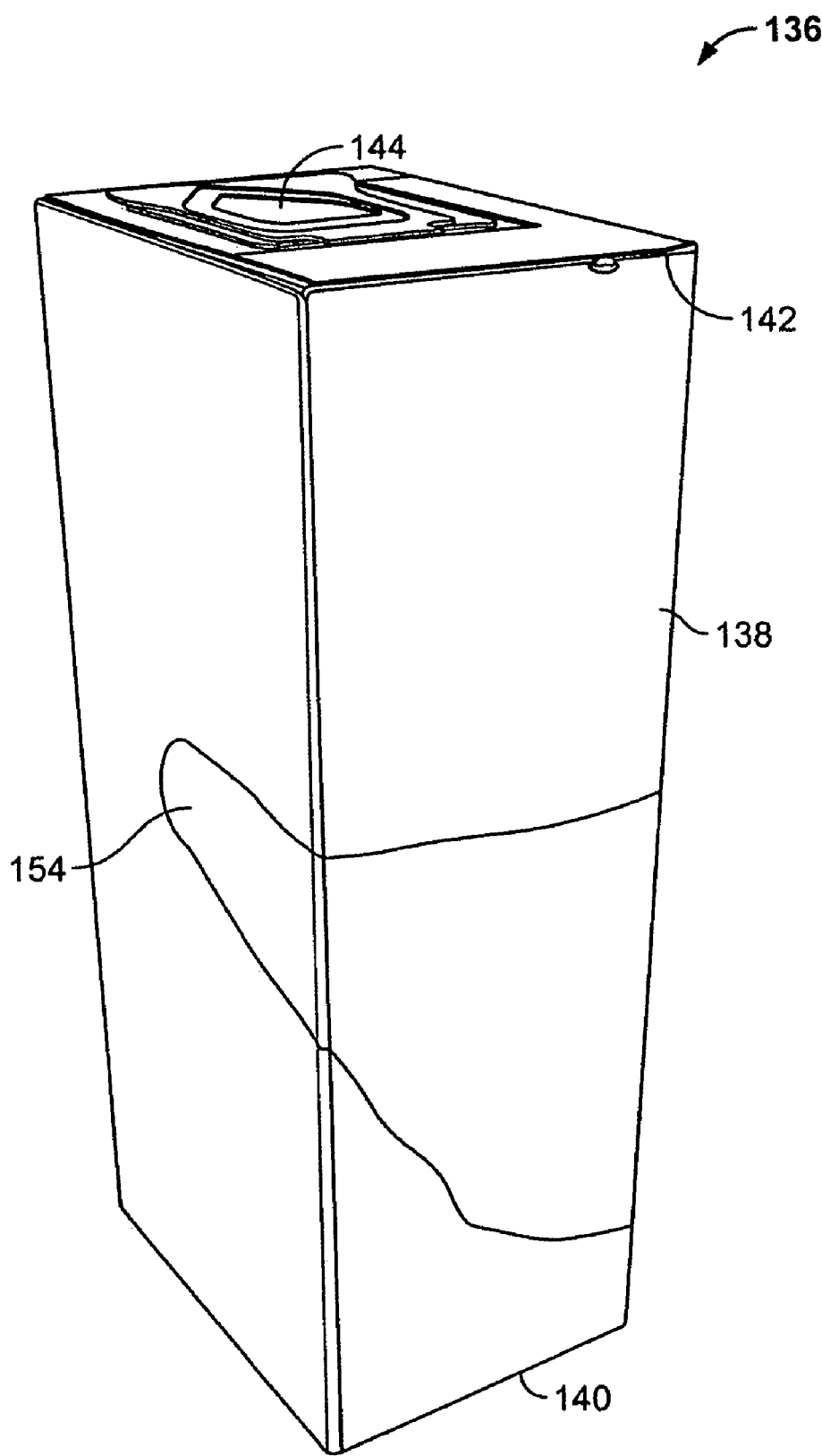
FIG. 25 depicts another isometric view of the container of FIG. 24 illustrating a side of the container opposite to that seen in FIG. 24.

Data for determining several indices related to the interaction between a user's hand and a plurality of containers are collected using a procedure hereinafter referred to as "the Broen methodology." A first step in the Broen methodology, which is indicated by block 120 of FIGS. 17 and 17A, is the collection of the containers to be tested. For purposes of explaining the Broen methodology four test containers, which are shown in FIGS. 18-25, are provided for every tester. A testing group of at least sixty people is required. Therefore, 60 of each container for a total of 240 containers are obtained. A first test container 122 is shown in FIGS. 18 and 19 and is similar to the embodiments discussed above. A second test container 124 is shown in FIGS. 20 and 21 and is identical to the first test container 122. A third test container 126 is shown in FIGS. 22 and 23 and comprises a carpet powder container currently marketed by S. C. Johnson & Son, Inc., under the brand name Glade® Carpet & Room Deodorizer and Rainshower® fragrance. The third test container 126 comprises a cylindrical body 128 having a bottom end 130 and a top end 132, wherein the top end 132 includes a dispenser portion 134. A fourth test container 136, which is shown in FIGS. 24 and 25, comprises an ARM & HAMMER® container currently marketed by Church & Dwight Co., Inc., under the brand name ARM & HAMMER® Carpet and Room Deodorizer. The fourth test container 136 comprises a rectangular body 138 having a bottom end 140 and a top end 142, wherein the top end 142 includes a dispensing portion 144.

A second step, which is indicated by block 146, is the preparation of the containers 122, 124, 126, 136 for testing. Preparation of the containers includes the provision of hand outlines on the containers to indicate to a tester how the container is to be held during testing. A hand outline 148 of the first test container 122 guides the tester's hand into the first holding condition described above. A hand outline 150 of the second test container 124 guides the tester's hand into the second holding condition. A hand outline 152 is also provided on the body 128 of the third test container 126 and a hand outline 154 is provided about a minor width dimension of the body 138 of the fourth test container 136. The hand outlines 148, 150, 152, 154 are shown in FIGS. 18-25. Besides orienting the tester's hand into the correct position, the labels also equalize the coefficient of friction across all of the test containers 122, 124, 126, 136. For purposes of the Broen methodology a one-sided Starliner® adhesive label manufactured by MACtac, Inc., located at 4560 Darrow Road, Stow, Ohio 44224-1898, and having a product number of SL0018, is used. The same labeling material is also used to cover any source identification indicators on the test containers 122, 124, 126, 136. Further, a testing identification number may be provided on a portion of the labels to identify each test container 122, 124, 126, 136.

Preparation of the test containers 122, 124, 126, 136 also includes weighing each test container 122, 124, 126, 136 to verify that 32 oz. of carpet powder is disposed therein. In the present example, the first and second test containers 122, 124 were initially empty. Therefore, the first and second test containers were first filled with 32 oz. of Rainshower® brand Glade® Carpet & Room Deodorizer carpet powder before being weighed. Further, 10.6 oz. of Rainshower® brand Glade® Carpet & Room Deodorizer and ARM & HAMMER® Carpet and Room Deodorizer were removed from the third and fourth test containers 126, 136, respectively, because each of the containers 126, 136 originally held 42.6 oz. of carpet powder. The 10.6 oz. reduction of product in the third and fourth containers 126, 136 does not adversely affect or skew the recorded data; i.e., there is no measurable impact force of the product traversing the empty space and colliding with a lid of the test container 126, 136.

The next step in the Broen methodology, indicated by block 156, is the establishment of a testing group with specific characteristics. Specifically, testers are chosen who are female, right-handed, and at least 21 years old. The testers are screened to determine that none suffer from asthma or any other breathing problem. Further, testers are selected who have used some type of hand-held product dispenser over a large area (e.g., a carpet powder on a living room floor, a fertilizer or grass seed in a yard, a cleanser on a kitchen floor, etc.) in the past year. Still further, each tester is the head of her household, meaning that the tester does the majority of the household grocery shopping and vacuum cleaning. It is the experience of the applicants that heads of households typically make the decision to purchase and use household product containers. As noted above, a total of at least sixty testers are selected for use in the Broen methodology and present example.

Block 158 indicates that the next step is the assembly of a testing staff. While the Broen methodology may be performed by only a test proctor and a computer operator, or in some instances by only one person performing all of the procedures, it has been found that four people are best suited to facilitate the testing procedure. Therefore, the testing staff preferably comprises a test proctor, a computer operator, a timer, and a receptionist/greeter. The testing staff initially congregates in a testing area to further implement the Broen methodology.

After the testing staff is assembled, block 160 indicates that the first tester is introduced to the testing area. The receptionist/greeter greets the first tester and steps the first tester through a series of tests. One test is a grip strength test of the first tester's right hand. A JAMAR® Hydraulic Hand Dynamometer of the type manufactured by Sammons Preston Rolyan, located at 270 Remington Blvd., Suite C, Bolingbrook, Ill. 60440-3593, and having a model number 5030J1, is used to measure the grip strength. A handle of the dynamometer is adjustable between five grip positions, wherein a grip position of 2 3/8 inches is used. The first tester holds the dynamometer in her right hand and squeezes with maximum force for one to two seconds. The peak force measurement is indicated by a rotating dial on the dynamometer. The grip strength test is performed two more times so that a total of three measurements are taken. The receptionist/greeter performs a similar second test on the first tester by measuring the pinch strength of the first tester's right hand. The pinch strength is measured by instructing the tester to pinch with maximum force a JAMAR® Hydraulic Pinch Gauge, manufactured by Sanmuons Preston Rolyan as noted above, and having a model number C7498-05, between the pad of the first tester's thumb and a lateral portion of the first tester's index finger. The pinch strength test is repeated two more times so that a total of three pinch strength measurements are taken. As noted below, the remaining 59 testers are also subjected to these first two tests at later points in the Broen methodology. Data from actual testing in accordance with the foregoing steps are summarized below in Table 1.

TABLE 1

Grip Strength and Pinch Strength Measurement Results

| Measure | Grip Strength (pounds) | | Pinch Strength (pounds) | |
|---|---|---|---|---|
| Minimum | 41.7 | | 9.3 | |
| Mean | 66.6 | | 16.2 | |
| Maximum | 104.0 | | 28.3 | |
| Standard Deviation | 13.4 | | 3.8 | |
| Distribution | 40.0-49.9 | 5 | 9.0-11.9 | 10 |
| | 50.0-59.9 | 16 | 12.0-14.9 | 11 |
| | 60.0-69.9 | 14 | 15.0-17.9 | 22 |
| | 70.0-79.9 | 16 | 18.0-20.9 | 10 |
| | 80.0-89.9 | 5 | 21.0-23.9 | 5 |
| | 90.0-99.9 | 3 | 24.0-26.9 | 0 |
| | 100.0-109.9 | 1 | 27.0-29.9 | 2 |

For purposes of the Broen methodology, an average grip strength of about 66.6 lbs is preferred. Particularly, an average grip strength within a range of 53.2 lbs to 80 lbs is required. Further, an average pinch strength of about 16.2 lbs is preferred. Particularly, an average pinch strength within a range of 12.4 lbs to 20 lbs is required.

The receptionist/greeter also measures the length and width of the first tester's right hand. Specifically, the length of the first tester's right hand is measured from a base of the right hand palm to a tip of the middle finger below the fingernail. More specifically, the first tester presses the palm of her right hand flat onto a planar surface so that a portion of the palm adjacent the wrist abuts a raised barrier. A movable bar is slid toward a tip of the tester's middle finger and provides, in conjunction with measurement demarcations along a portion of the surface, a length measurement of the hand. Three hand length measurements are taken and recorded by the receptionist/greeter. The width of the first tester's right hand is also measured three times. In one instance, the fingers and thumb of the tester's right hand are held together and the palm of the tester's hand is placed on the support surface. The thumb of the user's right hand is held against a second raised barrier. A second movable bar is slid toward an opposite side of the first tester's right hand until it abuts same, thereby providing a width measurement of the tester's hand in a similar manner as described above. This procedure is repeated two more times. A width of the tester's right hand is similarly measured three more times with the thumb held above the surface and the tester's index finger held against the barrier (i.e., the width of the hand absent the thumb is measured three times). Data resulting from such testing of the 60 testers noted above are summarized below in Table 2.

TABLE 2

Hand Measurement Results

| Measure | Hand Width without Thumb (millimeters) | | Hand Width with Thumb (millimeters) | | Hand Length (millimeters) | |
|---|---|---|---|---|---|---|
| Minimum | 67.7 | | 83.7 | | 154.3 | |
| Mean | 75.8 | | 95.1 | | 177.7 | |
| Maximum | 88.3 | | 109.7 | | 199.0 | |
| Standard Deviation | 5.0 | | 6.3 | | 10.4 | |
| Distribution | 67.0-70.9 | 11 | 83.0-86.9 | 6 | 154.0-160.9 | 2 |
| Freq's | 71.0-74.9 | 16 | 87.0-90.9 | 6 | 161.0-167.9 | 10 |
| | 75.0-78.9 | 18 | 91.0-94.9 | 20 | 168.0-174.9 | 12 |
| | 79.0-82.9 | 10 | 95.0-98.9 | 16 | 175.0-181.9 | 14 |
| | 83.0-86.9 | 2 | 99.0-102.9 | 4 | 182.0-188.9 | 12 |
| | 87.0-89.9 | 3 | 103.0-106.9 | 3 | 189.0-195.9 | 8 |
| | | | 107.0-110.9 | 5 | 196.0-200.9 | 2 |

For purposes of the Broen methodology, an average hand length measurement of about 177.7 mm is preferred. Particularly, an average hand length measurement of 167.3 mm to 188.1 mm is required. Further, an average hand width measurement including the thumb of about 95.1 mm is preferred. Particularly, an average hand width measurement including the thumb within a range of 88.8 mm to 101.4 mm is required. Still further, an average hand width measurement without the thumb of about 75.8 mm is preferred. Particularly, an average hand width measurement without the thumb within a range of 70.8 mm to 80.8 mm is required.

After completion of the force measurement tests and hand size measurements the receptionist/greeter guides the first tester to a portion of the testing area where the containers 122, 124, 126, 136 are to be tested, which may be a separate testing room. The test proctor, the timer, and the computer operator are within or within the vicinity of the testing room. The testing room has a target line on the floor that is made from tape, paper, or some other indication means. The target line has a length of about 50 in. and a width of about 5¾ in. Prior to relaying any testing instructions to the first tester, the test proctor inspects the first tester's right hand and instructs the tester to remove any rings or other objects from the tester's right hand and fingers.

Figure 26:
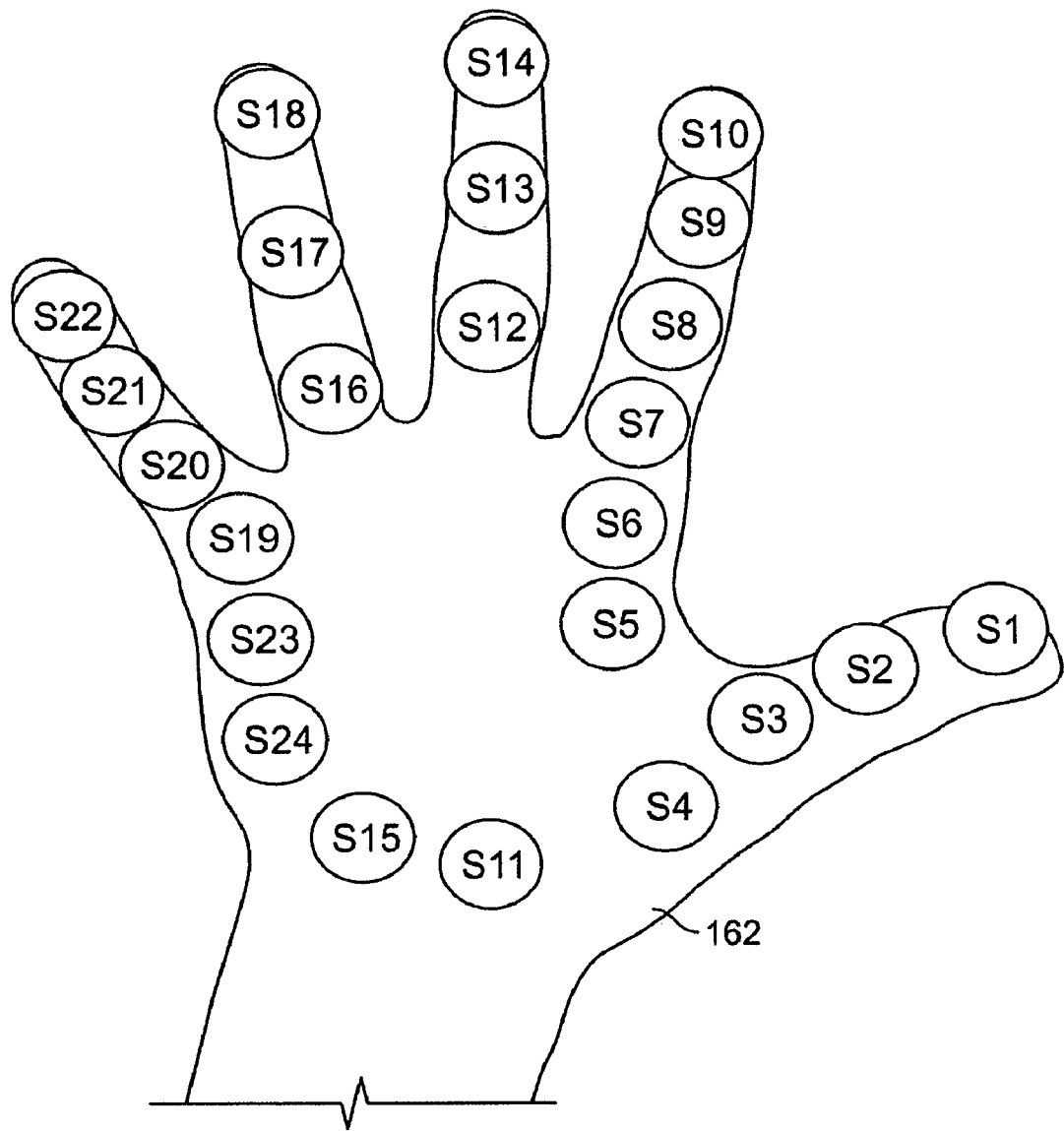
FIG. 26 is a schematic view of a glove with sensors disposed thereon that may be used to test one or more grip parameters of a container.

A Glove Pressure Mapping System (GPMS), such as the one manufactured by VERG, Inc., located at Vista Medical Ltd., Unit #3-55 Henlow Bay, Winnipeg, Manitoba, R3Y 1G4, and having a model number UT 5010-2037, is thereafter provided to the tester for measuring pressure data. The GPMS comprises a plurality of Intelligent Sensor Series (ISS) sensors, also manufactured by VERG, Inc., and a computer interface. Sensors s1-s24 are disposed on an outside surface of a glove 162 depicted in FIG. 26, which is a Fisherbrand® Nitrile Examination Glove, size medium. Sensors s1-s24 are disposed on an outside surface of the glove 162 by double-sided tape in the arrangement shown in FIG. 26. The sensors s1-s24 are placed on the glove 162 prior to placing the glove 162 on the tester's hand. All of the sensors s1-s24 are disposed on a side of the glove 162 adjacent the palm and inside finger surfaces of the right hand.

The sensors s1-s24 comprise pressure sensing components and transmit data to a computer or storage device. In the present embodiment, each sensor is square in shape and has a length and width of about 0.25 in. The sensors s1-s24 are unidirectional in the sense that only pressure normal to the face of the sensor is measured. Further, the sensors are adapted to measure pressure within a range of 0 to 10 psi. Wires extend from each of the sensors s1-s24 to a glove interface on the glove 162. A computer interface, such as a Force Sensitive Applications (FSA) unit manufactured by VERG, Inc., is connected to the glove 162. A computer is connected to the FSA unit. Software provided with the GPMS, which is also supplied by VERG, Inc., allows a user to activate the glove sensors and store data collected from the sensors s1-s24 in the computer.

Block 164 illustrates that the next step comprises the relaying of general instructions to the first tester. Prior to handing a first one of the test containers to the tester, the test proctor reads instructions outlining the procedures that are to be followed during testing. Following is a set of instructions for the 60 testers noted above:

"Before you begin, I will give you all of your instructions.

Each product is marked with an outline of a hand showing you where we would like you to hold the product. I would like you to stand to the side of the stripe that's on the floor. When I hand you the product, please hold it in an upright position until the timekeeper tells you to sprinkle it. Sprinkle as you would at home. Please sprinkle the product the length of the stripe. We'll hand you the product, tell you when to sprinkle and when to stop.

When you are finished, please wait in the hall while we vacuum. We will repeat this process three more times. Do you have any questions?"

After reading the set of instructions the test proctor provides a fully open test container 122, 124, 126, 136 on a support surface for the tester to pick up. FIG. 13 is illustrative of how the dispensing mechanism 28 of test containers 122, 124 must be positioned to be fully open. The third test container 126 is fully open when the plurality of holes comprising a portion of the dispenser portion 134 is unobstructed. The fourth test container 136 is fully open when a flap on the top end 142 thereof is pulled back to provide an unobstructed passage through a hole of the dispensing portion 144.

The next step in the Broen methodology, which is indicated by block 166, is the provision of instructions to pick up the test container and collect data. The timer indicates to the first tester to pick up the provided container and to hold same in a non-dispensing holding position. The tester picks up the containers 122, 124, 126, 136 in the manner indicated by the hand outlines 148, 150, 152, 154. The order in which the test containers 122, 124, 126, 136 are tested may vary from tester to tester. For the purposes of the present example assume that the first through fourth containers 122, 124, 126, 136, respectively, are analyzed in sequence. A computer operator begins recording pressure measurement information from the sensors s1-s24 of the glove 162. Pressure measurements are taken and stored in the computer every 0.1 to 0.2 seconds by the software program. (If desired, the measurement interval may be adjusted for an increased number of measurements or a decreased number of measurements per second.) The recording of pressure data begins before the tester picks up the test container 122 so that no data are missed. The actual start of the non-dispensing holding condition for purposes of the analyses discussed below is determined by reviewing the collected data to determine the point in time where the first sensor s1-s24 recorded a measurement.

Block 168 indicates that the tester is to hold the testing container 122 in the non-dispensing holding condition for ten seconds. More particularly, a range of 7 to 17 seconds is required for collecting data in the non-dispensing condition. The ten second holding period includes the time spent by the tester to pick up the first test container 122 and move same into the non-dispensing holding condition. The test container 122 is held in the non-dispensing position similar to that described above so that the bottom end 14 of the test container 122 is substantially parallel to the floor. Typically, the tester's forearm and hand are held in a position about 90 degrees from her upper arm and body so that the forearm and hand are also substantially parallel to the floor.

The next step, which is illustrated by block 170, indicates that the timer instructs the tester to sprinkle the product from the test container 122 after the tester has held the container in the non-dispensing position for 10 seconds. More particularly, a range of 7 to 17 seconds is required for collecting data in the dispensing condition. The computer operator marks the frame of the recorded data commensurate with the timer's instructions with a "sprinkle" indicator, which may comprise a symbol or character developed by a computer interface such as a mouse or keyboard. The tester then sprinkles (dispenses) the product onto the target line as the timer monitors the elapsed time with a timepiece. The ten second sprinkle period includes the time required by the tester to move her arm from the non-dispensing hold condition to the dispensing sprinkle condition.

Block 172 indicates that the container 122 is to be held in the dispensing position for ten seconds. During the sprinkling phase the tester is allowed to sprinkle the product from the container in the ordinary manner in which she feels comfortable, i.e., the test proctor does not tell the tester how to move her arm or hand during the sprinkling phase. Upon expiration of the 10 second interval, block 174 indicates that the timer instructs the tester to stop sprinkling and to put the container down on a support surface. Further, the computer operator stops recording pressure data upon hearing the instruction to stop sprinkling.

The first tester is allowed a period of rest after completing a first phase of the testing, as shown by block 178. Block 180 indicates a query is undertaken after completion of the testing phase to determine whether all four containers have been tested. In the present example, the second, third and fourth test containers 124, 126, 136 are still to be tested. Therefore, block 180 indicates that the testing staff returns to the step of providing instructions to pick up the test container and collect data as depicted by block 166. The second, third, and fourth test containers 124, 126, 136 are thereafter tested in a similar manner as the first test container 122 and follow the same sequence of steps until the query in block 180 is again encountered. After all four test containers 122, 124, 126, 136 are tested the carpet powder is removed from the floor on and/or adjacent the target line.

After the first tester has completed testing of all four containers and the containers are weighed as indicated in block 182, a second query is undertaken to determine whether all sixty testers have performed the above enumerated steps, as indicated by block 184. If not, then the sequence of steps starts again at block 160 where the next tester is introduced to the testing area. Thereafter, the above noted steps are repeated for the next tester and all remaining testers. After all sixty testers are tested, the next step, as indicated by block 186, is to develop a statistical analysis and indices to explain the results of the Broen methodology.

After completion of the testing phase, the various recorded sensor data comprising pressure measurements from all of the testers' hands with respect to the four test containers 122, 124, 126, 136 are collected and reviewed, typically in a program such as Excel®, to determine the several indices that describe the containers. Sensor measurements below 0.08 psi are considered background noise and assigned a value of zero.

The data provided from the testing phase may be used to calculate a Broen-Rung Mean Pressure Index (hereinafter the "BRMP Index"). The BRMP Index is a measurement of the average pressure exerted by all of the testers' hands for each respective testing container 122, 124, 126, 136 in each dispensing state (dispensing and non-dispensing). Therefore, the BRMP Index is determined by averaging all of the readings taken by each sensor s1-s24 for all 60 testers during a specific dispensing state. For example, to determine the BRMP Index of the test container 122 in a non-dispensing position all of the measurements from the 24 sensors s1-s24 taken during the 10 second interval the test container 122 is held in a non-dispensing position are averaged for a single tester. Specifically, each sample is converted to a number, and the numbers developed from all of the samples measured by the 24 sensors during the 10 second interval are added together and the resulting sum is divided by the number of samples multiplied by 24. This step is repeated for the remaining 59 testers. All of the resulting 60 averages are then averaged together to get the BRMP index for test container 122 in the non-dispensing position. This process is thereafter repeated for the remaining three test containers 124, 126, 136 in the non-dispensing position to obtain BRMP indices for each of these containers 124, 126, 136. Further, this process is also repeated for the four test containers 122, 124, 126, 136 in the dispensing position. The BRMP indices of the four test containers 122, 124, 126, 136 as tested by the 60 testers noted above are provided below in Table 3.

TABLE 3

BRMP Indices

| Test Container | BRMP Index for Non-Dispensing Position (psi) | BRMP Index Range for Non-Dispensing Position (psi) | BRMP Index for Dispensing Position (psi) | BRMP Index Range for Dispensing Position (psi) |
|---|---|---|---|---|
| 122 | 0.036 | 0.034-0.037 | 0.046 | 0.045-0.047 |
| 124 | 0.057 | 0.055-0.058 | 0.060 | 0.059-0.061 |
| 126 | 0.051 | 0.049-0.053 | 0.062 | 0.061-0.064 |
| 136 | 0.064 | 0.063-0.066 | 0.061 | 0.060-0.062 |

A T-test is also performed to determine with a 95% statistical confidence level that the calculated BRMP Index value will fall within a specified range as enumerated in Table 3.

The data provided from the testing phase may also be used to calculate a Broen-Rung Pressure Variance Index (hereinafter the "BRPV Index"). The BRPV Index is a measurement of the pressure variance across all of the testers' hands for each respective testing container 122, 124, 126, 136 in each dispensing state (dispensing and non-dispensing). Similar to the BRMP Index discussed above, the BRPV Index of the test container 122 in a non-dispensing position is calculated by first averaging all of the measurements from the 24 sensors s1-s24 taken during the 10 second interval the test container 122 was held in the non-dispensing position for a single tester. This step is repeated for the remaining 59 testers for the non-dispensing position of test container 200. Specifically, each sample is converted to a number, and the numbers developed from all of the samples measured by the 24 sensors during the 10 second interval are added together and the resulting sum is divided by the number of samples multiplied by 24. This step is repeated for the remaining 59 testers. All 60 averages are then averaged together to get a total average across all sixty testers. The BRPV Index is determined by taking the summation of the difference between each individual tester's average pressure and the total average pressure and dividing this result by the difference between the total number of testers and one (i.e., 59 in this example). This process is thereafter repeated for the remaining three test containers 124, 126, 136 in the non-dispensing position. Further, this process is also repeated for the test containers 122, 124, 126, 136 in the dispensing position. The BRPV indices of the four test containers 122, 124, 126, 136 that were tested by the above-noted 60 testers are provided below in Table 4.

TABLE 4

BRPV Indices

| Test Container | BRPV Index for Non-Dispensing Position (psi) | BRPV Index Range for Non-Dispensing Position (psi) | BRPV Index for Dispensing Position (psi) | BRPV Index Range for Dispensing Position (psi) |
|---|---|---|---|---|
| 122 | 0.057 | 0.057-0.058 | 0.030 | 0.030-0.030 |
| 124 | 0.115 | 0.114-0.116 | 0.049 | 0.048-0.049 |
| 126 | 0.082 | 0.081-0.082 | 0.073 | 0.072-0.073 |
| 136 | 0.066 | 0.065-0.066 | 0.035 | 0.035-0.035 |

Similar to the BRMV Index, a T-test is also performed to determine with a 95% statistical confidence level that the calculated BRFV Index value will fall within a specified range as enumerated in Table 4.

The data provided from the testing phase can further be used to calculate a Broen-Rung Principal Component Index (hereinafter the "BRPC Index"). More particularly, the data may be used to calculate the BRPC Index for a dispensing position or a non-dispensing position (hereinafter the "Dispensing BRPC Index" and the "Non-dispensing BRPC Index," respectively). By way of example, the process to calculate the Dispensing BRPC Index is explained below. The same process is used to determine the Non-dispensing BRPC Index.

The first step in calculating the Dispensing BRPC Index is to average all of the measurements with respect to a particular tester and test container for each individual sensor s1-s24 over the 10 second dispensing interval to get a mean measurement for each sensor s1--24. Thereafter, all 60 testers' mean measurements are averaged to get 24 test container specific mean measurements (hereinafter "m1-m24"). Therefore, four sets of 24 container specific mean measurements m1-m24 are calculated. For example, all of the measurements for the sensor s1 for a single tester over the entire duration of the dispensing period for the test container 122 are averaged. This average is then averaged with similar results from the remaining 59 testers for the same dispensing action of the test container 122. The result is a test container specific mean measurement m1 for sensor s1 across all testers.

The average mean of each sensor measurement is also calculated across all 60 testers for three test containers. For purposes of calculating the Dispensing BRPC Index, test containers 126 and 136 are benchmark indicators that are included in all BRPC Index analyses. The remaining test container is either test container 122 or 124. Therefore, two sets of average means (hereinafter "avg m1-avg m24") are calculated; one that includes data relative to the test container 122 ($avg_{122}$ m1-$avg_{122}$ m24) and one that includes data relative to the test container 124 ($avg_{124}$ m1-$avg_{124}$ m24). For example, all of the measurements for the sensor s1 for a single tester over the entire duration of the dispensing period for the test containers 122, 126, and 136 are averaged. This average is then averaged with similar results from the remaining 59 testers for the same dispensing action of all three test containers 122, 126, and 136. The result is a non-test container specific mean ($avg_{122}$ m1-$avg_{122}$ m24).

A principal component analysis is used to reduce all of the sensor measurements s1-s24 from all sixty testers to one measure per container. A more comprehensive explanation of principal component analysis may be found in common statistical references sources, e.g., Johnson, R. A., and D. W.

Wichem. Jan. 15, 2002. *Applied Multivariate Statistical Analysis*, 5$^{th}$ edition. Prentice Hall. To perform this analysis the three sets of 24 container specific mean measurements m1-m24 used to calculate the average means (avg$_{122}$ m1-avg$_{122}$ m24) and the three sets of 24 container specific mean measurements m1-m24 used to calculate the average means (avg$_{124}$ m1-avg$_{124}$ m24) are separately inputted into a conventional statistical modeling software program, such as version 8 of the SAS (Statistical Analysis Software) program provided by the SAS Institute, Inc., located at 100 SAS Campus Drive, Cary, N.C. 27513-2414. A manual entitled PRINCOMP Procedure is available online at http://www.sas.com that provides further explanation on how to use the SAS program. The output of the software is several principal components that define the dispensing position, depending on which sets of container specific mean measurements m1-m24 are inputted. For example, if the three sets of 24 container specific mean measurements m1-m24 used to calculate the average means (avg$_{122}$ m1-avg$_{122}$ m24) are inputted into the software several principal components defining the test containers 122, 126, and 136 are outputted. Each principal component is further defined by a coefficient c1-c24 for each sensor s1-s24. Using standard accepted practices known by those skilled in the art, the number of principal components is reduced to include only those most relevant in explaining the total variance. In the present example using the data developed by the 60 testers noted above, the total variance of the average means (avg$_{122}$ m1-avg$_{122}$ m24) is 0.667. One of the principal components (hereinafter the "1$^{st}$ principal component") that defines the total variance constitutes 58% of same, which is a statistically relevant portion of the total variance. The software program provides 24 coefficients c1$_{122}$-c24$_{122}$ defining the sensors s1-s24, respectively, for the 1$^{st}$ principal component. While the 1$^{st}$ principal component is a function of all 24 sensor readings across all of the containers, the majority of the variance as defined by the principal component is a function of the 2 sensors s1 and s2 on the thumb of the glove. Similar calculations are performed for the average means (avg$_{124}$ m1-avg$_{124}$ m24) that results in a total variance of 0.774 and a principal component that constitutes 59% of the total variance.

The BRPC Index is thereafter calculated by utilizing the following equation:

BRPC Index=$C1*(m1\text{-avg }m1)+C2*(m2\text{-avg }m2)+\ldots +C24*(m24\text{-avg }m24)$ For example, to calculate the BRPC Index for test container 122 the difference between the mean measurements (m1$_{122}$-m24$_{122}$) and the average means (avg$_{122}$ m1-avg$_{122}$ m24) are determined for all 24 sensors. The differences are thereafter multiplied by the respective coefficients c1-c24 determined from the principal component analysis of the average means (avg$_{122}$ m1-avg$_{122}$ m24). Similarly, the BRPC Index of container 136 is calculated in the present example by substituting the mean force measurements (m1$_{122}$-m24$_{122}$) with (m1$_{136}$-m24$_{136}$). The results of the Dispensing and Non-dispensing BRPC Index analyses are provided in Tables 5 and 6, respectively, below.

TABLE 5

BRPC Indices Including Test Container 122

| Test Container | Dispensing BRPC Index | P-value for Dispensing BRPC Index | Conclusion at 90% Level P-value Equals 0 | Non-Dispensing BRPC Index | P-value for Non-Dispensing BRPC Index | Conclusion at 90% Level P-value Equals 0 |
|---|---|---|---|---|---|---|
| 122 | −0.087 | 0.166 | Yes | −0.025 | 0.583 | Yes |
| 126 | 0.246 | 0.030 | No | 0.192 | 0.007 | No |
| 136 | −0.155 | 0.002 | No | −0.164 | 0.000 | No |

TABLE 6

BRPC Indices Including Test Container 124

| Test Container | Dispensing BRPC Index | P-value for Dispensing BRPC Index | Conclusion at 90% Level P-value Equals 0 | Non-Dispensing BRPC Index | P-value for Non-Dispensing BRPC Index | Conclusion at 90% Level P-value Equals 0 |
|---|---|---|---|---|---|---|
| 124 | −0.025 | 0.771 | Yes | 0.026 | 0.732 | Yes |
| 126 | 0.214 | 0.057 | No | 0.125 | 0.082 | No |
| 136 | −0.185 | 0.000 | No | −0.148 | 0.001 | No |

T-tests were performed on all of the BRPC Indices to test the hypothesis that the BRPC Index is zero. The T-test is the most commonly used method to evaluate the differnces in means between groups. A P-value reported with a T-test represents the probability of error involved in accepting the hypothesis about the existence of a difference. To reject the hypothesis that the BRPC Index is greater than zero at a 90% confidence level the P-level cannot be larger than 0.1.

The test containers 122 and 124, which are the container 10 held in the first and second holding conditions, respectively, have BRPC Index values of zero in both dispensing and non-dispensing conditions. A Broen-Rung index value of zero means that the tested container, compared to the two other benchmark containers, exhibits relatively little variance in measurement readings over the entire hand of the user with respect to the average measurements of the tested container and the two benchmark containers. In contrast, a Broen-Rung index greater than zero means that the force measurement readings taken from a user's hand when holding the test container exhibit a substantial degree of variability from the average force measurement readings of the test container and two benchmark containers.

It is envisioned that designers may use the Broen methodology to design a having at least one of a BRMP Index in a range of about 0.045 psi to about 0.047 psi in a dispensing condition, a BRMP Index within a range of about 0.034 psi to about 0.037 psi in a non-dispensing condition, a BRPV Index of about 0.030 psi in a dispensing condition, a BRPV Index within a range of about 0.057 psi to about 0.058 psi in a non-dispensing condition, and a BRPC Index of zero. By testing various shapes of containers using the Broen methodology a designer can empirically determine a desirable shape for a container. The resulting design determined through the Broen methodology can then be molded or otherwise formed in a manner evident to one of ordinary skill in the art. Thereafter, a container can be produced with the desired BRMP, BRPV, and BRPC indices noted above.

INDUSTRIAL APPLICABILITY

The container described herein advantageously minimizes the amount of force required to separate portions of a dispensing mechanism, provides for easier alignment of dispensing mechanism portions, and provides enhanced dispensing characteristics.

Numerous modifications will be apparent to those skilled in the art in view of the foregoing description. Accordingly, this description is to be construed as illustrative only and is presented for the purpose of enabling those skilled in the art to make and use what is herein disclosed and to teach the best mode of carrying out same. All patents, patent applications, and other references cited herein are incorporated herein by reference as if they appear in this document in their entirety. The exclusive rights to all modifications which come within the scope of this disclosure are reserved.

We claim:

1. A dispensing cap for a container, comprising
   a first lid having a dispensing surface and a continuous skirt depending from a periphery thereof, wherein the dispensing surface is formed from at least one of a substantially transparent and translucent material and includes several apertures, and wherein a bead having spaced interruptions extends circumferentially around an inside wall of the skirt below the dispensing surface;
   a second lid having a second dispensing surface and a second skirt depending from a periphery thereof that is adapted to be inserted into and releasably held within the first lid, wherein the second dispensing surface includes several orifices; and
   a second bead extending circumferentially around the inside wall of the continuous skirt, wherein the second bead is spaced from a bottom end thereof and is adapted to prevent solid particles from traversing a space between an exterior wall of the second skin and the inside wall of the continuous skirt,
   wherein the first and second lids are rotatable a full 360° relative to one another, and
   wherein the at least one substantially transparent and translucent material of the first lid provides for the relative positioning of the first lid and the second lid to achieve a desired dispensing rate.

2. The dispensing cap of claim 1, wherein rotation of the first and second lids relative to one another permits selection of one of a plurality of dispensing conditions.

3. The dispensing cap of claim 2, wherein the several apertures of the first lid are fully aligned with the several orifices of the second lid so as to define a path of egress through the first and second lids.

4. The dispensing cap of claim 2, wherein the several apertures of the first lid are partially aligned with the several orifices of the second lid so as to define a partial path of egress through the first and second lids.

5. The dispensing cap of claim 2, wherein the several apertures of the first lid are not aligned with the several orifices of the second lid so as to provide no path of egress through the first and second lids.

6. A lid for a receptacle, comprising:
   an outer lid having a circular first surface and a continuous outer skin depending from a periphery thereof, wherein a retaining bead extends circumferentially around an inside wall of the outer skirt below the first surface, and wherein the retaining bead includes spaced interruptions therein; and
   an inner lid having a circular second surface and an inner skirt depending from a periphery thereof, wherein the inner lid is sized to fit within the outer lid so that the inside wall of the outer skin is adjacent an exterior wall of the inner skin and a bottom lip of the inner skirt is in an interfering relationship with the retaining bead,
   wherein a second bead extends circumferentially around the inside wall of the outer skirt above the retaining bead, wherein the second bead is adapted to prevent solid particles from traversing a space between the exterior wall of the inner skirt and the inside wall of the outer skirt,
   wherein the outer and inner lids are rotatable with respect to each other when engaged with one another; and
   wherein the interruptions of the retaining bead are adapted to provide flexure to the outer lid for removal of same from the inner lid.

7. The lid of claim 6, wherein the retaining bead includes sixteen equidistantly spaced interruptions.

8. The lid of claim 6, wherein the retaining bead is disposed adjacent a bottom end of the outer skin.

9. The lid of claim 6, wherein a locking member extends circumferentially around an interior wall of the inner lid that is adapted to engage a complementary locking member on a neck of a container.

10. The lid of claim 9, wherein a plurality of spaced tabs extend circumferentially around the interior wall of the inner lid above the locking member and extend radially inward, wherein the plurality of spaced tabs interact with protrusions on the neck of the container to prevent substantial rotational movement of the inner lid.

11. The lid cit claim 6, wherein an outside wall of the outer skirt includes a plurality of scallops adapted to provide flexure to the outer lid for removal of same from the inner lid.

12. The lid of claim 7, wherein a peel label is disposed over the second surface of the inner lid.

* * * * *

UNITED STATES PATENT AND TRADEMARK OFFICE
CERTIFICATE OF CORRECTION

PATENT NO. : 7,438,204 B2  Page 1 of 1
APPLICATION NO. : 11/249843
DATED : October 21, 2008
INVENTOR(S) : Simon M. Conway et al.

It is certified that error appears in the above-identified patent and that said Letters Patent is hereby corrected as shown below:

Column 22, Line 26: replace "skin" with --skirt--

Column 22, Line 27: replace "skin" with --skirt--

Column 22, Line 43: replace "skin" with --skirt--

Column 22, Line 54: replace "cit" with --of--

Signed and Sealed this

Thirtieth Day of December, 2008

JON W. DUDAS
*Director of the United States Patent and Trademark Office*